United States Patent
Miyazaki

(10) Patent No.: US 12,301,962 B2
(45) Date of Patent: May 13, 2025

(54) IMAGING DEVICE AND IMAGING METHOD WITH ADJUSTMENT OF THRESHOLD VALUE CORRESPONDING TO CHANGE IN SIGNALS FROM PHOTOELECTRIC CONVERSION ELEMENTS

(71) Applicant: Sony Semiconductor Solutions Corporation, Kanagawa (JP)

(72) Inventor: Takahiro Miyazaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 87 days.

(21) Appl. No.: 17/996,492

(22) PCT Filed: May 13, 2021

(86) PCT No.: PCT/JP2021/018273
§ 371 (c)(1),
(2) Date: Oct. 18, 2022

(87) PCT Pub. No.: WO2021/235323
PCT Pub. Date: Nov. 25, 2021

(65) Prior Publication Data
US 2023/0224558 A1 Jul. 13, 2023

(30) Foreign Application Priority Data
May 21, 2020 (JP) .................................. 2020-088929

(51) Int. Cl.
*H04N 23/13* (2023.01)
*H04N 23/61* (2023.01)
(Continued)

(52) U.S. Cl.
CPC ............ *H04N 23/13* (2023.01); *H04N 23/61* (2023.01); *H04N 23/633* (2023.01); *H04N 23/80* (2023.01)

(58) Field of Classification Search
CPC ...... H04N 23/13; H04N 23/61; H04N 23/633; H04N 23/80; H04N 23/60; H04N 25/76
See application file for complete search history.

(56) References Cited

U.S. PATENT DOCUMENTS

| | | | |
|---|---|---|---|
| 2002/0101532 A1* | 8/2002 | Takayama | H04N 25/532 348/E5.037 |
| 2007/0069768 A1* | 3/2007 | Hatooka | H03K 5/19 327/74 |

(Continued)

FOREIGN PATENT DOCUMENTS

| | | |
|---|---|---|
| JP | 2017535999 A | 11/2017 |
| JP | 2020072471 A | 5/2020 |
| WO | 2019135303 A1 | 7/2019 |

OTHER PUBLICATIONS

International Search Report (PCT/ISA/210), International Application No. PCT/JP2021/018273, dated Aug. 17, 2021.

*Primary Examiner* — Hung H Lam
(74) *Attorney, Agent, or Firm* — Michael Best & Friedrich LLP

(57) ABSTRACT

To reliably and efficiently detect an event.
An imaging device includes: a plurality of photoelectric conversion elements each of which is configured to photoelectrically convert incident light to generate an electric signal; a plurality of detectors each of which is configured to output a detection signal in a case where an absolute value of an amount of change in the electric signal generated by each of the plurality of photoelectric conversion elements exceeds a predetermined threshold value; and a threshold value adjustment unit configured to adjust the threshold value on the basis of a detection situation of the respective detection signals from the plurality of detectors.

20 Claims, 31 Drawing Sheets

(51) Int. Cl.
*H04N 23/63* (2023.01)
*H04N 23/80* (2023.01)

(56) References Cited

U.S. PATENT DOCUMENTS

| | | | | |
|---|---|---|---|---|
| 2011/0254974 A1* | 10/2011 | Daisuke | ............... | H04N 23/88 |
| | | | | 348/E9.051 |
| 2011/0292240 A1* | 12/2011 | Sekiguchi | ............ | H04N 23/745 |
| | | | | 348/226.1 |
| 2012/0013915 A1* | 1/2012 | Okamura | ............. | A61B 3/1025 |
| | | | | 356/213 |
| 2021/0385402 A1* | 12/2021 | Zhu | ........................ | H04N 25/00 |

* cited by examiner

IMAGING SCENE

IMAGING DEVICE AND IMAGING METHOD WITH ADJUSTMENT OF THRESHOLD VALUE CORRESPONDING TO CHANGE IN SIGNALS FROM PHOTOELECTRIC CONVERSION ELEMENTS

TECHNICAL FIELD

The present disclosure relates to an imaging device and an imaging method.

BACKGROUND ART

There is known an imaging device that acquires data of a portion where a luminance level has changed due to an event only when the event occurs in an imaging scene. This type of imaging device may be referred to as an event base vision sensor (EVS).

CITATION LIST

Patent Document

Patent Document 1: Japanese Unexamined Patent Application Publication No. 2017-535999

SUMMARY OF THE INVENTION

Problems to be Solved by the Invention

In the conventional EVS, since the detection threshold value of the event is basically fixed, the number of detected events is extremely increased or decreased depending on the imaging scene. For example, in an imaging scene in which flicker occurs, there is a possibility that events other than the flicker are overlooked as a result of detecting many noise events due to flicker. In addition, in an imaging scene in a dark place such as nighttime, there is a possibility that an object that has entered the imaging scene cannot be accurately detected because the number of detected events is small.

In addition, the conventional EVS detects an event for all pixels, and in a case where an event occurs only in a partial pixel region, there is a possibility that it takes time to detect the event or that the event in the partial pixel region fails to be detected.

Therefore, the present disclosure provides an imaging device and an imaging method capable of reliably and efficiently detecting an event.

Solution to Problems

In order to solve the above problems, according to the present disclosure, there is provided an imaging device including
  a plurality of photoelectric conversion elements each of which is configured to photoelectrically convert incident light to generate an electric signal,
  a plurality of detectors each of which is configured to output a detection signal in a case where an absolute value of an amount of change in the electric signal generated by each of the plurality of photoelectric conversion elements exceeds a predetermined threshold value, and
  a threshold value adjustment unit configured to adjust the threshold value on the basis of a detection situation of the respective detection signals from the plurality of detectors.

The detection situation in the plurality of detectors may include at least one of the number of the detection signals detected in a predetermined region within a predetermined period, a ratio of the number of the detectors that output the detection signals to a total number of the detectors in the predetermined region, or a signal level of the detection signals.

The threshold value adjustment unit may adjust the threshold value in at least one of a case where the number of the detection signals in the predetermined region within the predetermined period is greater than or equal to first reference value or a case where the number of the detection signals in the predetermined region within the predetermined period is less than a second reference value.

The threshold value adjustment unit may adjust the threshold value so that detection sensitivity of the detector is low in a case where the number of the detection signals in the predetermined region within the predetermined period is equal to or greater than the first reference value.

The threshold value adjustment unit may adjust the threshold value so that detection sensitivity of the detector is high in a case where the number of the detection signals in the predetermined region within the predetermined period is less than the second reference value.

The threshold value may include a first threshold value and a second threshold value,
  the detector may include
  a first detector configured to detect a first detection signal in a case where an absolute value of an amount of change when the electric signal changes in an increasing direction exceeds the first threshold value and
  a second detector configured to detect a second detection signal in a case where an absolute value of an amount of change when the electric signal changes in a decreasing direction exceeds the second threshold value, and
  the threshold value adjustment unit may adjust the first threshold value and the second threshold value on the basis of detection situations in the first detector and the second detector.

The imaging device may further include a first determination unit configured to determine whether or not a detection situation in the first detector is within a first allowable range, and
  a second determination unit configured to determine whether or not a detection situation in the second detector is within a second allowable range, in which
  the threshold value adjustment unit may adjust the first threshold value when the first determination unit determines that the detection situation is not within the first allowable range, and may adjust the second threshold value when the second determination unit determines that the detection situation is not within the second allowable range.

According to the present disclosure, there is provided an imaging device including
  a plurality of first photoelectric conversion elements each of which is configured to photoelectrically convert incident light to generate an electric signal,
  a plurality of detectors each of which is configured to output a detection signal in a case where an absolute value of an amount of change in the electric signal generated by each of the plurality of first photoelectric conversion elements exceeds a predetermined threshold value, and
  a region extraction unit configured to extract a partial region within an angle of view in which the plurality of first photoelectric conversion elements performs photoelectrical conversion on the basis of a detection situation of the detection signals from the plurality of detectors.

The region extraction unit may extract the partial region on the basis of positions where the detection signals are output within an angle of view in which the plurality of first photoelectric conversion elements performs photoelectrical conversion.

The imaging device may include an object recognition unit configured to recognize an object present within an angle of view in which the plurality of first photoelectric conversion elements performs photoelectrical conversion on the basis of a detection situation of the detection signals from the plurality of detectors, in which the region extraction unit extracts the partial region including the object recognized by the object recognition unit.

The imaging device may include a notification unit configured to notify at least one of the plurality of first photoelectric conversion elements or the plurality of detectors of information about the partial region.

The notification unit may notify the detector of information regarding an appropriate number of the detection signals to be detected by the plurality of detectors together with the information regarding the partial region.

The plurality of detectors may adjust the threshold value on the basis of information regarding an appropriate number of the detection signals notified by the notification unit.

The imaging device may further include an information processing unit configured to generate operating condition information including at least one of a photoelectric conversion speed by the plurality of first photoelectric conversion elements, a ratio of first photoelectric conversion elements that perform photoelectric conversion to the plurality of first photoelectric conversion elements, or an activation frequency of the plurality of first photoelectric conversion elements on the basis of a detection situation of the detection signals from the plurality of detectors, in which the notification unit may notify at least one of the plurality of first photoelectric conversion elements or the plurality of detectors of the operating condition information.

The region extraction unit may output event information based on the detection signals output from the detectors associated with the first photoelectric conversion elements located in the partial region.

The region extraction unit may output information about the coordinate position of the partial region together with the event information.

The imaging device may include an imaging unit that includes a plurality of second photoelectric conversion elements each of which photoelectrically converts incident light to generate an electric signal, and that is configured to output image data in the partial region on the basis of the electric signal.

The imaging device may include an image correction unit configured to correct the image data on the basis of event information based on the detection signals output from the detectors associated with the first photoelectric conversion elements located in the partial region.

According to the present disclosure, there is provided an imaging method including outputting a detection signal in a case where an absolute value of an amount of change in an electric signal generated by a plurality of photoelectric conversion elements each of which photoelectrically converts incident light to generate the electric signal exceeds a predetermined threshold value, and adjusting the threshold value on the basis of a detection situation of the detection signals.

The method may further include extracting a partial region within an angle of view in which the plurality of first photoelectric conversion elements performs photoelectrical conversion on the basis of a detection situation of the detection signals.

MODE FOR CARRYING OUT THE INVENTION

Hereinafter, embodiments of an imaging device and an imaging method will be described with reference to the drawings. Although main components of the imaging device and the imaging method will be mainly described below, the imaging device and the imaging method may have components and functions that are not illustrated or described. The following description does not exclude components and functions that are not illustrated or described.

Figure 1:
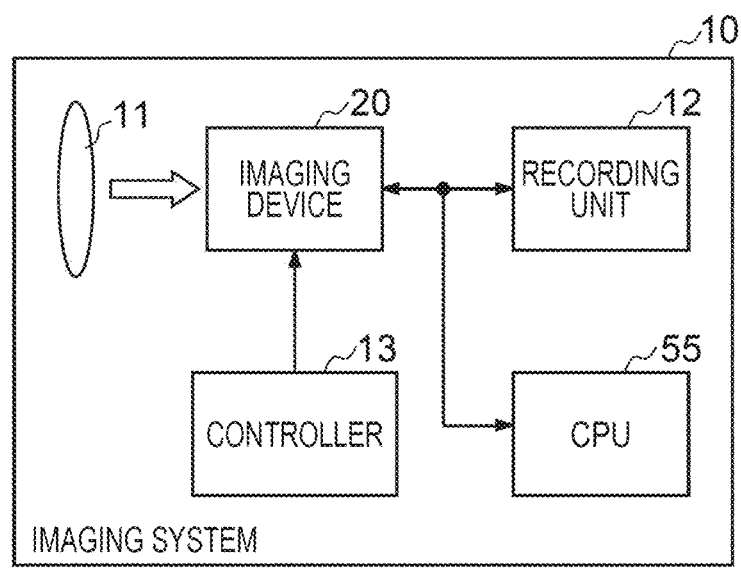
FIG. 1 is a block diagram illustrating an example of a system configuration of an imaging system to which a technology according to the present disclosure is applied.

FIG. 1 is a block diagram illustrating an example of a system configuration of an imaging system to which the technology according to the present disclosure is applied.

As illustrated in FIG. 1, an imaging system 10 to which the technology according to the present disclosure is applied includes an imaging lens 11, an imaging device 20, a recording unit 12, a controller 13, and a CPU 55. The imaging system 10 is an example of an electronic device of the present disclosure, and examples of the electronic device include a camera system mounted on an industrial robot, an in-vehicle camera system, and the like.

In the imaging system 10 having the above configuration, the imaging lens 11 captures incident light from a subject and forms an image on an imaging surface of the imaging device 20. The imaging device 20 photoelectrically converts incident light captured by the imaging lens 11 in units of pixels to acquire imaging data. As the imaging device 20, an imaging device of the present disclosure described later is used.

The imaging device 20 executes predetermined signal process such as image recognition process on the captured image data to output data indicating a processing result and a detection signal (hereinafter, it may be simply described as a "detection signal") of an address event to be described later to the recording unit 12. A method of generating the detection signal of the address event will be described later. The recording unit 12 stores data supplied from the imaging device 20 via a signal line 14. The controller 13 includes, for example, a microcomputer, and controls an imaging operation in the imaging device 20. The CPU 55 performs various types of information processes on the basis of the event signal output from the imaging device 20. Note that the CPU 55 may be provided inside the imaging device 20.

[Imaging Device According to First Configuration Example (Arbiter Method)]

Figure 2:
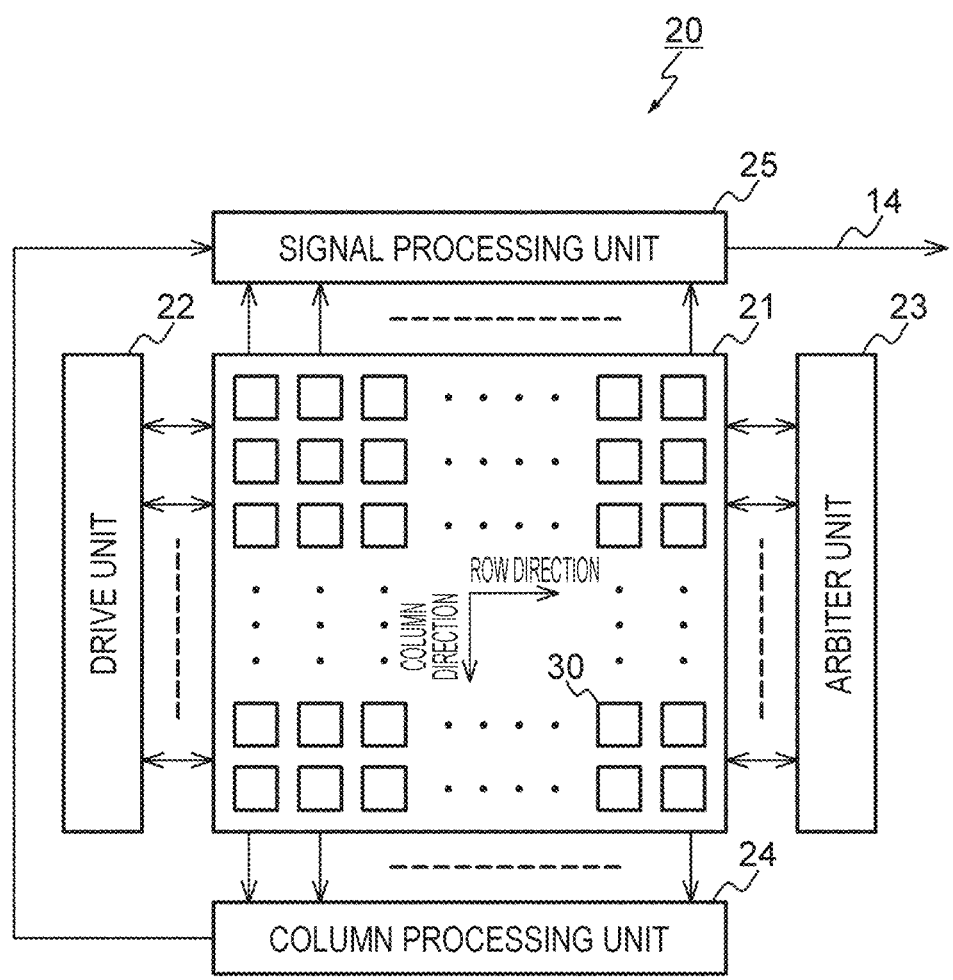
FIG. 2 is a block diagram illustrating an example of a configuration of an imaging device according to a first configuration example of the present disclosure.

FIG. 2 is a block diagram illustrating an example of a configuration of an imaging device according to a first configuration example used as the imaging device 20 in the imaging system 10 to which the technology according to the present disclosure is applied.

As illustrated in FIG. 2, the imaging device 20 according to the first configuration example as the imaging device of the present disclosure is an asynchronous type imaging device called an EVS, and includes a pixel array unit 21, a drive unit 22, an arbiter unit (arbitration unit) 23, a column processing unit 24, and a signal processing unit 25.

In the imaging device 20 having the above configuration, a plurality of pixels 30 is two-dimensionally disposed in a matrix (array) in the pixel array unit 21. A vertical signal line VSL to be described later is wired for each pixel column with respect to this matrix-like pixel array.

Each of the plurality of pixels 30 generates an analog signal of a voltage corresponding to a photocurrent as a pixel signal. In addition, each of the plurality of pixels 30 detects the presence or absence of an address event on the basis or whether or not the amount of change in the photocurrent exceeds a predetermined threshold value. Then, when an address event occurs, the pixel 30 outputs a request to the arbiter unit 23.

The drive unit 22 drives each of the plurality of pixels 30 to output the pixel signal generated in each pixel 30 to the column processing unit 24.

The arbiter unit 23 arbitrates a request from each of the plurality of pixels 30 to transmit a response based on the arbitration result to the pixel 30. The pixel 30 that has received the response from the arbiter unit 23 supplies a detection signal (detection signal of the address event) indicating a detection result to the drive unit 22 and the signal processing unit 25. The reading of the detection signal from the pixel 30 can be performed by reading a plurality of rows.

The column processing unit 24 includes, for example, an analog-to-digital converter, and performs processing of converting an analog pixel signal output from the pixel 30 of the column into a digital signal for each pixel column of the pixel array an it 21. Then, the column processing unit 24 supplies the analog-digital converted digital signal to the signal processing unit 25.

The signal processing unit 25 performs the predetermined signal process such as the correlated double sampling (CDS) process or the image recognition process on the digital signal supplied from the column processing unit 24. Then, the signal processing unit 25 supplies the data indicating the processing result and the detection signal supplied from the arbiter unit 23 to the recording unit 12 (see FIG. 1) via the signal line 14.

[Configuration Example of Pixel Array Unit]

Figure 3:
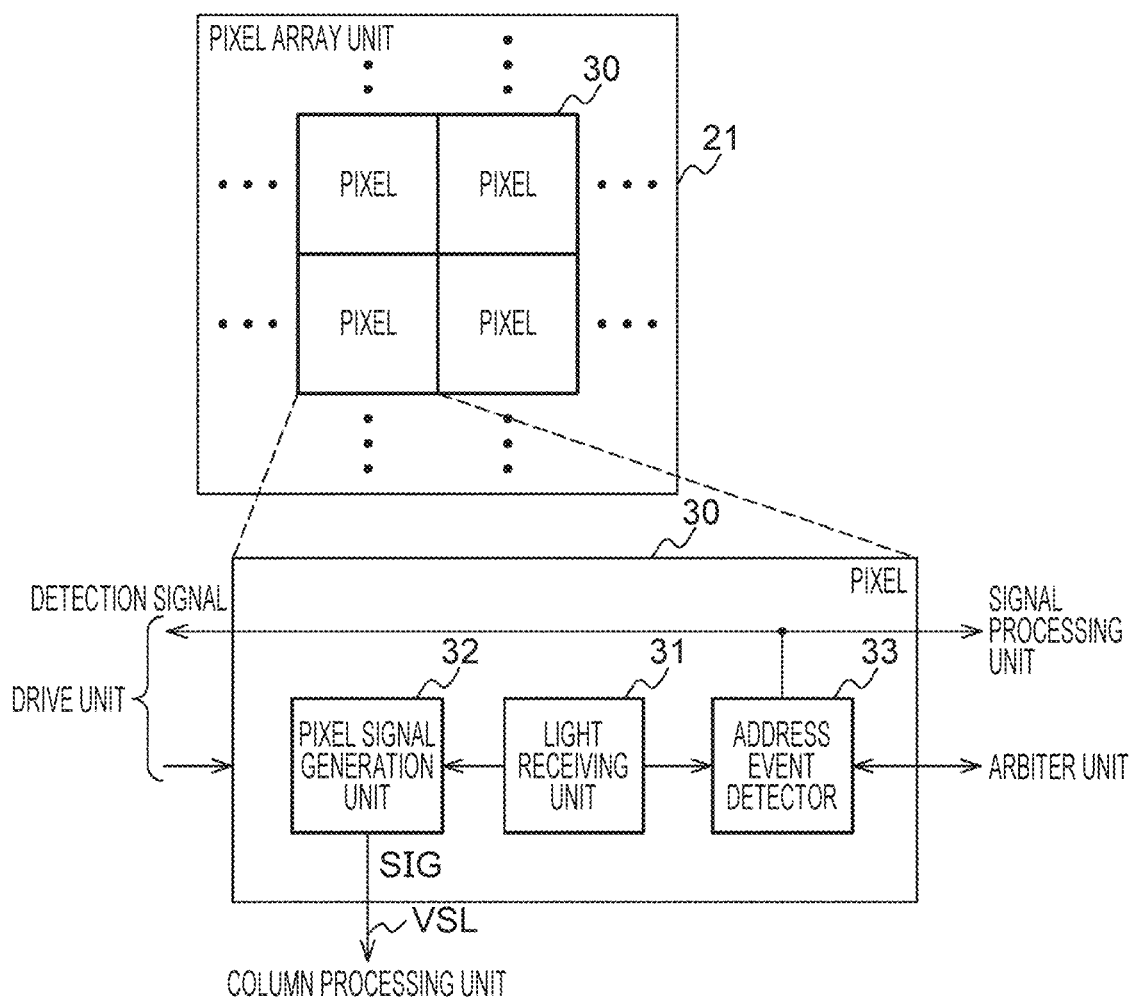
FIG. 3 is a block diagram illustrating an example of a configuration of a pixel array unit.

FIG. 3 is a block diagram illustrating an example of a configuration of the pixel array unit 21.

In the pixel array unit 21 in which a plurality of pixels 30 is two-dimensionally disposed in a matrix, each of the plurality of pixels 30 includes a light receiving unit 31, a pixel signal generation unit 32, and an address event detector 33.

In the pixel 30 having the above configuration, the light receiving unit 31 photoelectrically converts the incident light to generate a photocurrent. Then, the light receiving unit 31 supplies the photocurrent generated by photoelectric conversion to either the pixel signal generation unit 32 or the address event detector 33 under the control of the drive unit 22 (see FIG. 2).

The pixel signal generation unit 32 generates a signal of a voltage correspond in to the photocurrent supplied from the light receiving unit 31 as a pixel signal SIG, and supplies the generated pixel signal SIG to the column processing unit 24 (see FIG. 2) via the vertical signal line VSL.

The address event detector 33 detects the presence or absence of an address event on the basis of whether or not the amount of change in the photocurrent from each of the light receiving units 31 exceeds a predetermined threshold value. The address event includes, for example, an on-event indicating that the amount of change in the photocurrent exceeds the upper limit threshold value and an off-event indicating that the amount of change falls below the lower limit threshold value. In addition, the detection signal of the address event, includes, for example, one bit indicating the detection result of the on-event and one bit indicating the detection result of the off-event. Note that the address event detector 33 can be configured to detect only an on-event.

When an address event occurs, the address event detector 33 supplies a request for requesting transmission of a detection signal of the address event to the arbiter unit 23 (see FIG. 2). Then, upon receiving a response to the request from the arbiter unit 23, the address event detector 33 supplies a detection signal of the address event to the drive unit 22 and the signal processing unit 25.

[Exemplary Circuit Configuration of Pixel]

Figure 4:
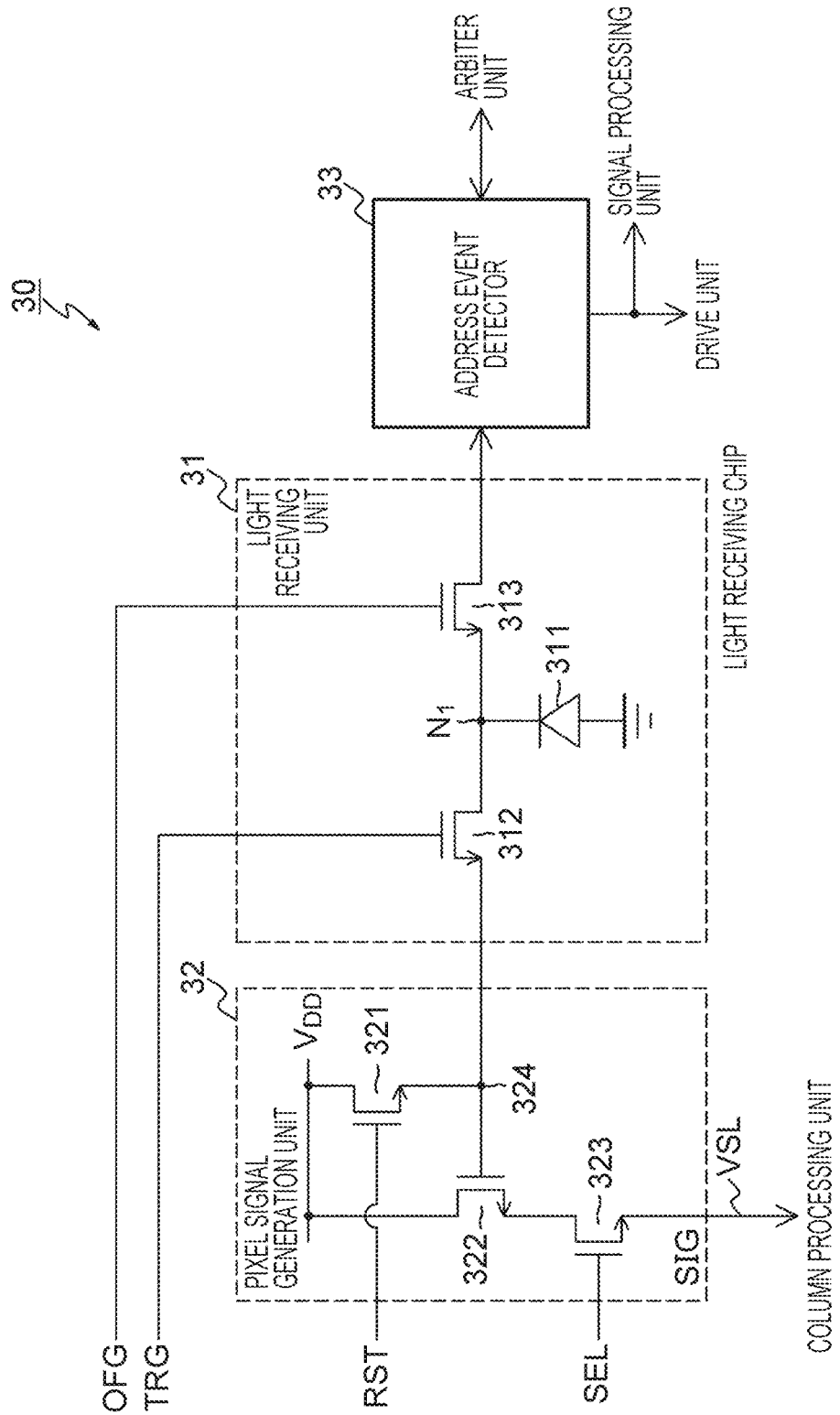
FIG. 4 is a circuit diagram showing an example of a circuit configuration of a pixel.

FIG. 4 is a circuit diagram illustrating an example of a circuit configuration of the pixel 30. As described above, each of the plurality of pixels 30 includes the light receiving unit 31, the pixel signal generation unit 32, and the address event detector 33.

In the pixel 30 having the above configuration, the light receiving unit 31 includes a light receiving element (photoelectric conversion element) 311, a transfer transistor 312, and an over flow gate (OFG) transistor 313. As the transfer transistor 312 and the OFG transistor 313, for example, an N-type metal oxide semiconductor (MOS) transistor is used. The transfer transistor 312 and the OFG transistor 313 are connected in series to each other.

The light receiving element 311 is connected between the common connection node $N_1$ of the transfer transistor 312 and the OFG transistor 313 and the ground, and photoelectrically converts the incident light to generate a charge of a charge amount corresponding to the amount of the incident light.

A transfer signal TRG is supplied from the drive unit 22 illustrated in FIG. 2 to the gate electrode of the transfer transistor 312. In response to the transfer signal TRG, the transfer transistor 312 supplies the charge photoelectrically converted by the light receiving element 311 to the pixel signal generation unit 32.

A control signal OFG is supplied from the drive unit 22 to the gate electrode of the OFG transistor 313. In response to the control signal OFG, the OFG transistor 313 supplies the electric signal generated by the light receiving element 311 to the address event detector 33. The electric signal supplied to the address event detector 33 is a photocurrent including charges.

The pixel signal generation unit 32 includes a reset transistor 321, amplification transistor 322, a selection transistor 323, and a floating diffusion layer 324. As the reset transistor 321, the amplification transistor 322, and the selection transistor 323, for example, N-type MOS transistors are used.

The charge photoelectrically converted by the light receiving element 311 is supplied from the light receiving unit 31 to the pixel signal Generation unit 32 by the transfer transistor 312. The charge supplied from the light receiving unit 31 is accumulated in the floating diffusion layer 324. The floating diffusion layer 324 generates a voltage signal having a voltage value corresponding to the amount of accumulated charges. That is, the floating diffusion layer 324 converts electric charge into voltage.

The reset transistor 321 is connected between the power supply line of a power supply voltage $V_{DD}$ and the floating diffusion layer 324. A reset signal RST is supplied from the drive unit 22 to the gate electrode of the reset transistor 321. The reset transistor 321 initializes (resets) the charge amount of the floating diffusion layer 324 in response to the reset signal RST.

The amplification transistor 322 is connected in series with the selection transistor 323 between the power supply line of the power supply voltage $V_{DD}$ and the vertical signal line VSL. The amplification transistor 322 amplifies the voltage signal subjected to charge-voltage conversion by the floating diffusion layer 324.

A selection signal SEL is supplied from the drive unit 22 to the gate electrode of the selection transistor 323. In response to the selection signal SEL, the selection transistor 323 outputs the voltage signal, as the pixel signal SIG, amplified by the amplification transistor 322 to the column processing unit 24 (see FIG. 2) via the vertical signal line VSL.

In the imaging device 20 including the pixel array unit 21 in which the pixels 30 having the above-described configuration are two-dimensionally disposed, when starting detection of an address event is instructed by the controller 13 illustrated in FIG. 1, the drive unit 22 supplies the control signal OFG to the OFG transistor 313 of the light receiving unit 31, thereby driving the OFG transistor 313 to supply photocurrent to the address event detector 33.

Then, when an address event is detected in a certain pixel 30, the drive unit 22 turns off the OFG transistor 313 of the pixel 30 and stops the supply of photocurrent to the address event detector 33. Next, the drive unit 22 drives the transfer transistor 312 by supplying the transfer signal TRG to the transfer transistor 312, and transfers the charge photoelectrically converted by the light receiving element 311 to the floating diffusion layer 324.

In this manner, the imaging device 20 including the pixel array unit 21 in which the pixels 30 having the above-described configuration are two-dimensionally disposed outputs only the pixel signal of the pixel 30 in which the address event is detected to the column processing unit 24. As a result, the power consumption of the imaging device 20 and the processing amount of the image processing can be reduced as compared with the case of outputting the pixel signals of all the pixels regardless of the presence or absence of the address event.

Note that the configuration of the pixel 30 exemplified here is an example, and is not limited to this configuration example. For example, the pixel configuration may not include the pixel signal generation unit 32. In the case of this pixel configuration, the OFG transistor 313 is omitted in the light receiving unit 31, and the transfer transistor 312 is only required to have the function of the OFG transistor 313.

[First Configuration Example of Address Event Detector]

Figure 5:
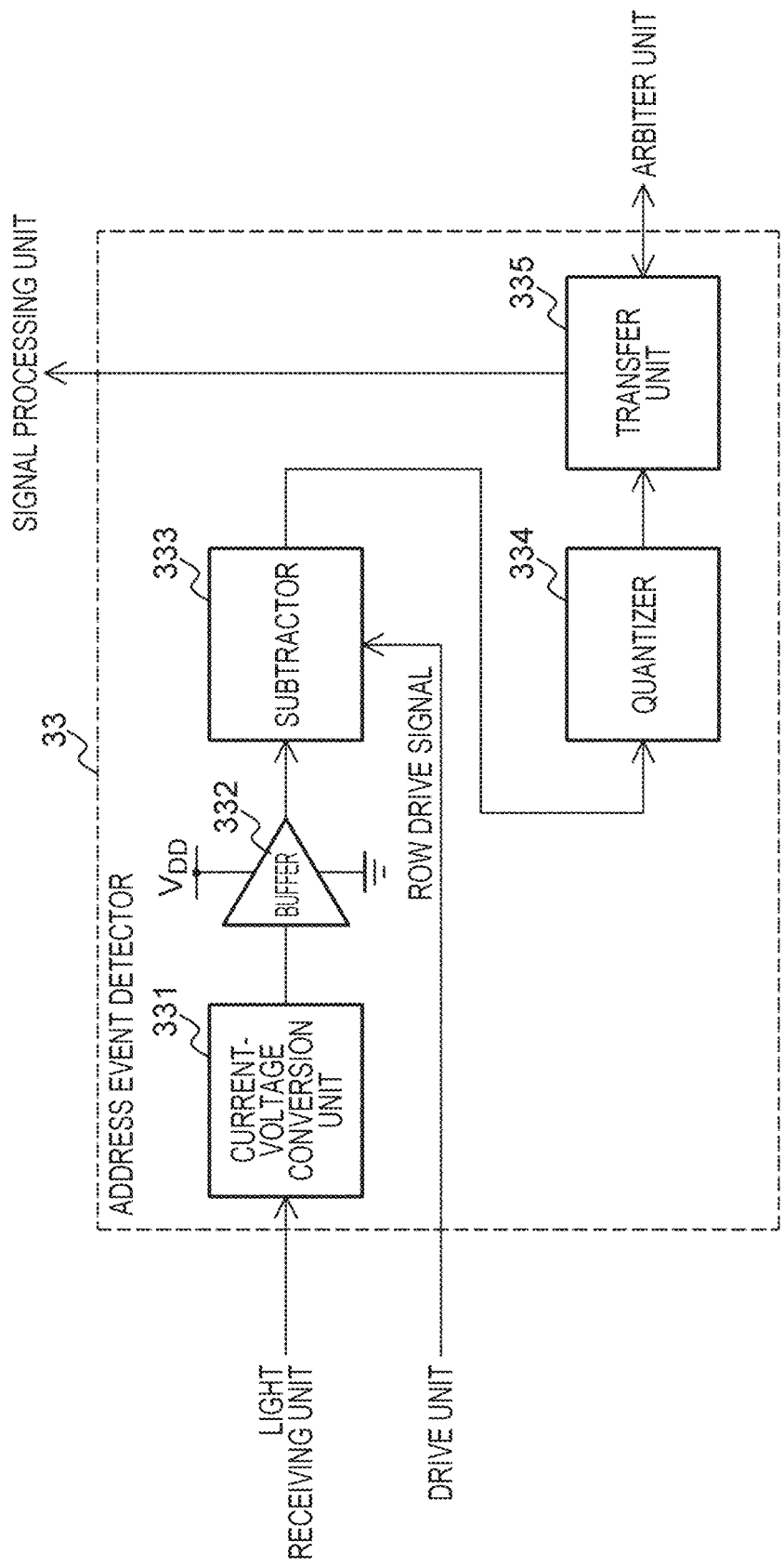
FIG. 5 is a block diagram illustrating a first configuration example of an address event detector.

FIG. 5 is a block diagram illustrating a first configuration example of the address event detector 33. As illustrated in FIG. 5, the address event detector 33 according to the present configuration example includes a current-voltage conversion unit 331, a buffer 332, a subtractor 333, a quantize 334, and a transfer unit 335.

The current-voltage conversion unit 331 converts the photocurrent from the light receiving unit 31 of the pixel 30 into a logarithmic voltage signal. The current-voltage conversion unit 331 supplies the converted voltage signal to the buffer 332. The buffer 332 buffers the voltage signal supplied from the current-voltage conversion unit 331 and supplies the voltage signal to the subtractor 333.

A row drive signal is supplied from the drive unit 22 to the subtractor 333. The subtractor 333 lowers the level of the voltage signal supplied from the buffer 332 in accordance with the row drive signal. Then, the subtractor 333 supplies the voltage signal after the level reduction to the quantizer 334. The quantizer 334 quantizes the voltage signal supplied from the subtractor 333 into a digital signal to output the digital signal to the transfer unit 335 as a detection signal of an address event.

The transfer unit 335 transfers the detection signal of the address event supplied from the quantizer 334 to the arbiter unit 23 or the like. When an address event is detected, the transfer unit 335 supplies a request for requesting transmission of a detection signal of the address event to the arbiter unit 23. Then, upon receiving a response to the request from the arbiter unit 23, the transfer unit 335 supplies a detection signal of the address event to the drive unit 22 and the signal processing unit 25.

Next, configuration examples of the current-voltage conversion unit 331, the subtractor 333, and the quantizer 334 in the address event detector 33 will be described.

(Configuration Example of Current-Voltage Conversion Unit)

Figure 6:
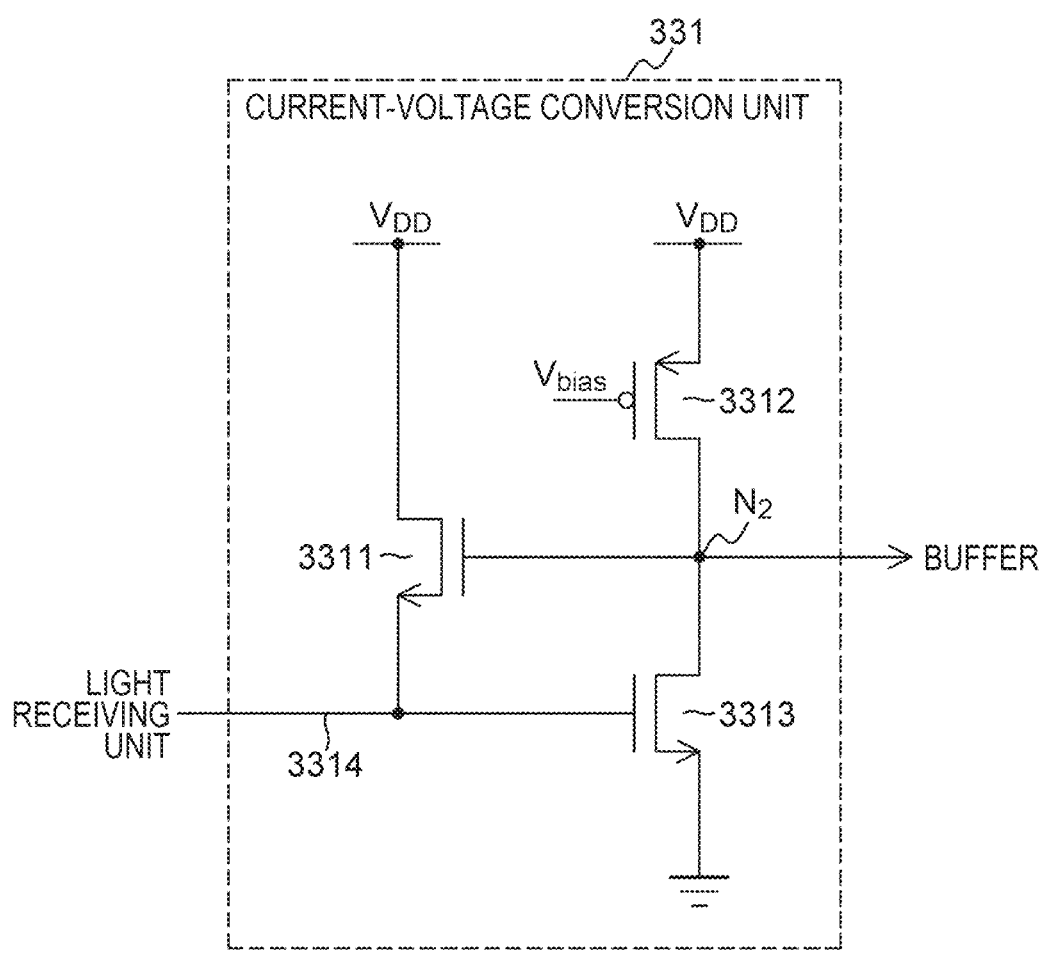
FIG. 6 is a circuit diagram illustrating an example of a configuration of a current-voltage conversion unit in an address event detector.

FIG. 6 is a circuit diagram illustrating an example of a configuration of the current-voltage conversion unit 331 in the address event detector 33. As illustrated in FIG. 6, the current-voltage conversion unit 331 according to the present example has a circuit configuration including an N-type transistor 3311, a P-type transistor 3312, and an N-type transistor 3313. As these transistors 3311 to 3313, for example, MOS transistors are used.

The N-type transistor 3311 is connected between the power supply line of the power supply voltage $V_{DD}$ and a signal input line 3314. The P-type transistor 3312 and the N-type transistor 3313 are connected in series between the power supply line of the power supply voltage $V_{DD}$ and the ground. Then, the common connection node $N_2$ of the P-type transistor 3312 and the N-type transistor 3313 is connected to the gate electrode of the N-type transistor 3311 and the input terminal of the buffer 332 illustrated in FIG. 5.

A predetermined bias voltage $V_{bias}$ is applied to the gate electrode of the P-type transistor 3312. As a result, the P-type transistor 3312 supplies a constant current to the N-type transistor 3313. A photocurrent is input from the light receiving unit 31 to the gate electrode of the N-type transistor 3313 through the signal input line 3314.

Drain electrodes of the N-type transistor 3311 and the N-type transistor 3313 are connected to a power supply, and such a circuit is referred to as a source follower. The photocurrent from the light receiving unit 31 is converted into a logarithmic voltage signal by the two source followers connected in the loop shape.

(configuration Examples of Subtractor and Quantizer)

Figure 7:
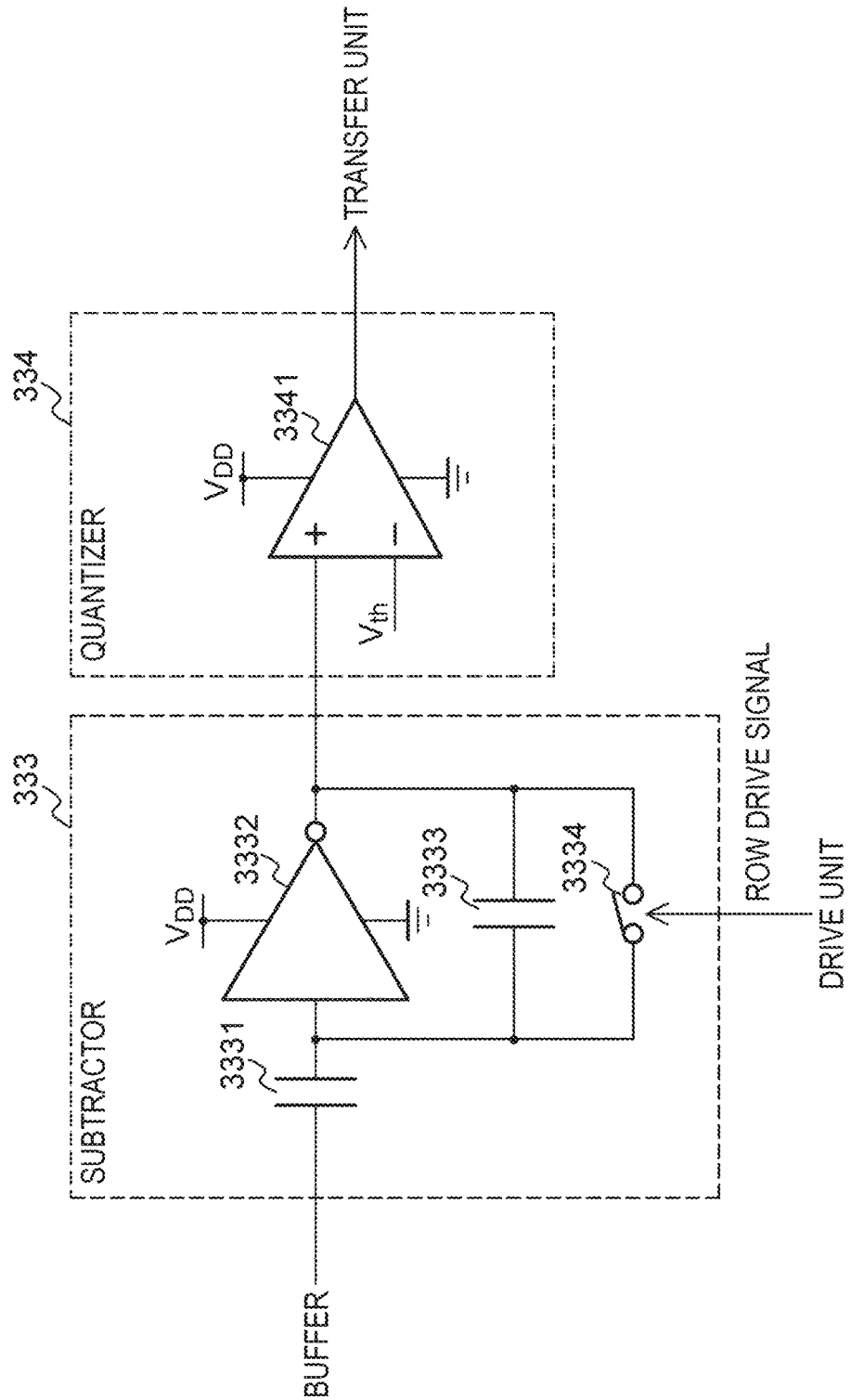
FIG. 7 is a circuit diagram illustrating an example of a configuration of a subtractor and a quantizer in an address event detector.

FIG. 7 is a circuit diagram illustrating an example of configurations of the subtractor 333 and the quantizer 334 in the address event detector 33.

The subtractor 333 according to the present example includes a capacitive element 3331, an inverter circuit 3332, a capacitive element 3333, and a switching element 3334.

One end of the capacitive element 3331 is connected to the output terminal of the buffer 332 illustrated in FIG. 5, and the other end thereof is connected to the input terminal of the inverter circuit 3332. The capacitive element 3333 is connected in parallel with respect to the inverter circuit 3332. The switching element 3334 is connected between both ends of the capacitive element 3333. A row drive signal is supplied from the drive unit 22 to the switching element 3334 as the opening/closing control signal. The switching element 3334 opens and closes a path connecting both ends of the capacitive element 3333 according to the row drive signal. The inverter circuit 3332 inverts the polarity of the voltage signal input via the capacitive element 3331.

In the subtractor 333 having the above configuration, when the switching element 3334 is turned on (closed), the voltage signal $V_{init}$ is input to the terminal of the capacitive element 3331 on the buffer 332 side, and the opposite terminal thereof is a virtual ground terminal. The potential of the virtual ground terminal is set to 0 for convenience. At this time, the charge $Q_{init}$ accumulated in the capacitive element 3331 is expressed by the following Expression (1) where $C_1$ is the capacitance value of the capacitive element 3331. On the other hand, since both ends of the capacitive element 3333 are short-circuited, the accumulated charge is 0.

$$Q_{init}=C_1 \times V_{init} \tag{1}$$

Next, considering a case where the switching element 3334 is turned off (open) and the voltage of the terminal of the capacitive element 3331 on the buffer 332 side changes to $V_{after}$, the charge $Q_{after}$ accumulated in the capacitive element 3331 is expressed by the following Expression (2).

$$Q_{after}=C_2 \times V_{after} \tag{2}$$

On the other hand, the charge $Q_2$ accumulated in the capacitive element 3333 is expressed by the following Expression (3) where $C_2$ is the capacitance value of the capacitive element 3333 and $V_{out}$ is the output voltage.

$$Q_2=-C_2 \times V_{out} \tag{3}$$

At this time, since the total charge amount of the capacitive element 3331 and the capacitive element 3333 does not change, the following Expression (4) is established.

$$Q_{init}=Q_{after}+Q_2 \tag{4}$$

When Expressions (1) to (3) are substituted into Expression (4) and deformed, the following Expression (5) is obtained.

$$V_{out}=-(C_1/C_2) \times (V_{after}-V_{init}) \tag{5}$$

Expression (5) represents the subtraction operation of the voltage signal, and the gain of the subtraction result is $C_1/C_2$.

Since it is usually desired to maximize the gain, it is preferable to design $C_1$ to be large and $C_2$ to be small. On the other hand, when $C_2$ is too small, kTC noise increases, and noise characteristics may deteriorate. Therefore, capacity reduction in $C_2$ is limited to a range in which noise can be tolerated. In addition, since the address event detector 33 including the subtractor 333 is mounted for each pixel 30, the capacitive element 3331 and the capacitive element 3333 have area restrictions. In consideration of these, the capacitance values $C_1$ and $C_2$ of the capacitive elements 3331 and 3333 are determined.

In FIG. 7, the quantizer 334 includes a comparator 3341. The comparator 3341 sets the output signal of the inverter circuit 3332, that is, the voltage signal from the subtractor 430 as a non-inverting (+) input, and sets a predetermined threshold value voltage $V_{th}$ as an inverting (−) input. Then, the comparator 3341 compares the voltage signal from the subtractor 430 with the predetermined threshold value voltage $V_{th}$ to output a signal, as an address event detection signal, indicating a comparison result to the transfer unit 335.

[Second Configuration Example of Address Event Detector]

Figure 8:
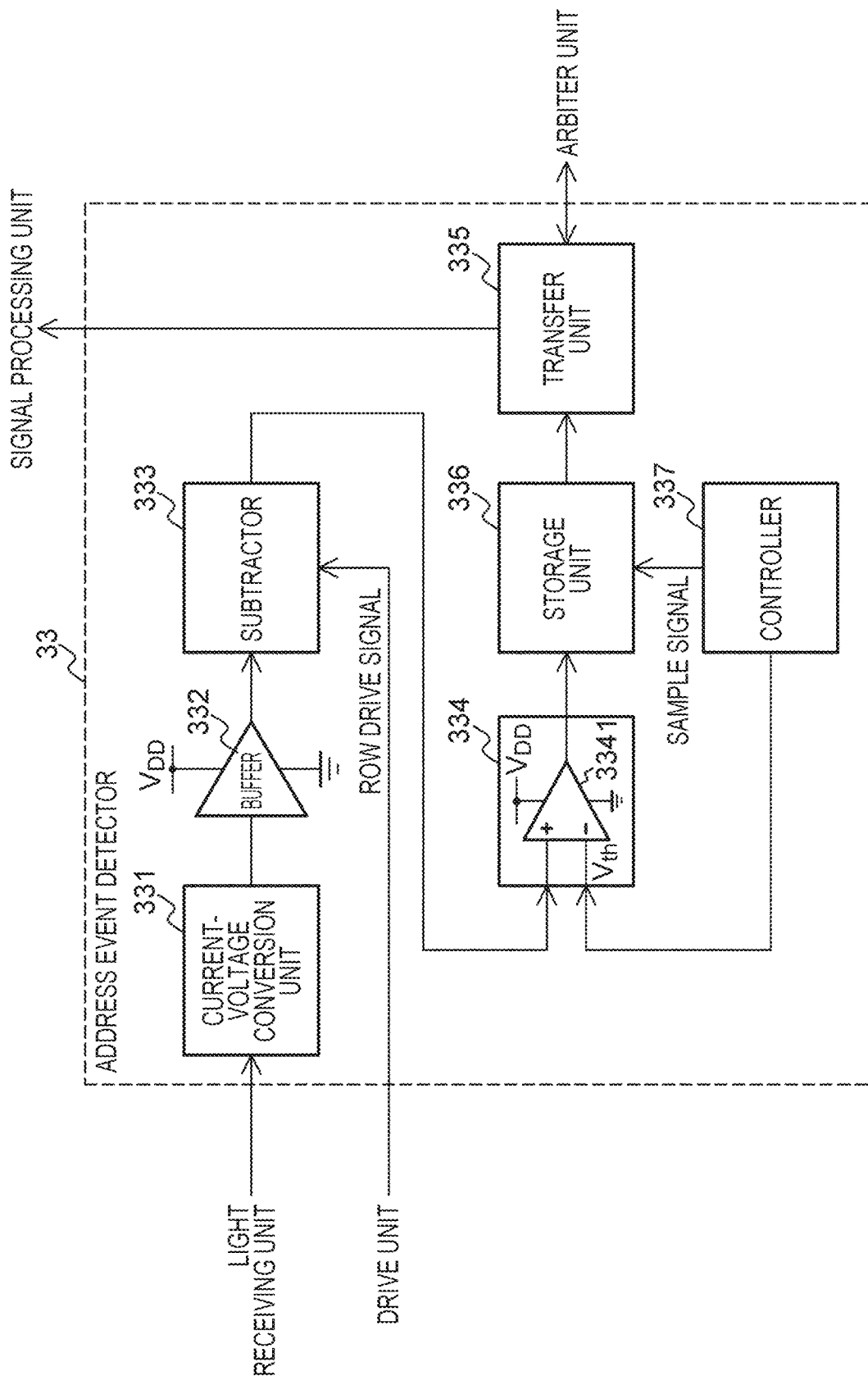
FIG. 8 is a block diagram illustrating a second configuration example of an address event detector.

FIG. 8 is a block diagram illustrating a second configuration example of the address event detector 33. As illustrated in FIG. 8, the address event detector 33 according to the present configuration example includes a storage unit 336 and a controller 337 in addition to the current-voltage conversion unit 331, the buffer 332, the subtractor 333, the quantizer 334, and the transfer unit 335.

The storage unit 336 is provided between the quantizer 334 and the transfer unit 335, and accumulates the output of the quantizer 334, that is, the comparison result of the comparator 3341 on the basis of the sample signal supplied from the controller 337. The storage unit 336 may be a sampling circuit such as a switch, plastic, or a capacitor, or may be a digital memory circuit such as a latch or a flip-flop.

The controller 337 supplies a predetermined threshold value voltage $V_{th}$ to the inverting (−) input terminal of the comparator 3341. The threshold value voltage $V_{th}$ supplied from the controller 337 to the comparator 3341 may have different voltage values in a time division manner. For example, the controller 337 supplies the threshold value voltage $V_{th1}$ associated with the on-event indicating that the amount of change in the photocurrent exceeds the upper limit threshold value and the threshold value voltage $V_{th2}$ associated with the off-event indicating that the amount of change falls below the lower limit threshold value at different timings, so that one comparator 3341 can detect a plurality of types of address events.

For example, the storage unit 336 may accumulate the comparison result of the comparator 3341 using the threshold value voltage $V_{th1}$ associated with the on-event in a period in which the threshold value voltage $V_{th2}$ associated with the off-event is supplied from the controller 337 to the inversion (−) input terminal of the comparator 3341. Note that the storage unit 336 may be inside the pixel 30 or may be outs de the pixel 30. In addition, the storage unit 336 is not an essential component of the address event detector 33. That is, the storage unit 336 may be omitted.

[Imaging Device (Scanning Method) According to Second Configuration Example]

The imaging device 20 according to the first configuration example described above is an asynchronous type imaging device that reads an event by an asynchronous readout method. However, the event readout method is not limited to the asynchronous readout method, but may be a synchronous readout method. The imaging device to which the synchronous readout method is applied is an imaging device of a scanning method, which is the same as a normal imaging device that performs imaging at a predetermined frame rate.

Figure 9:
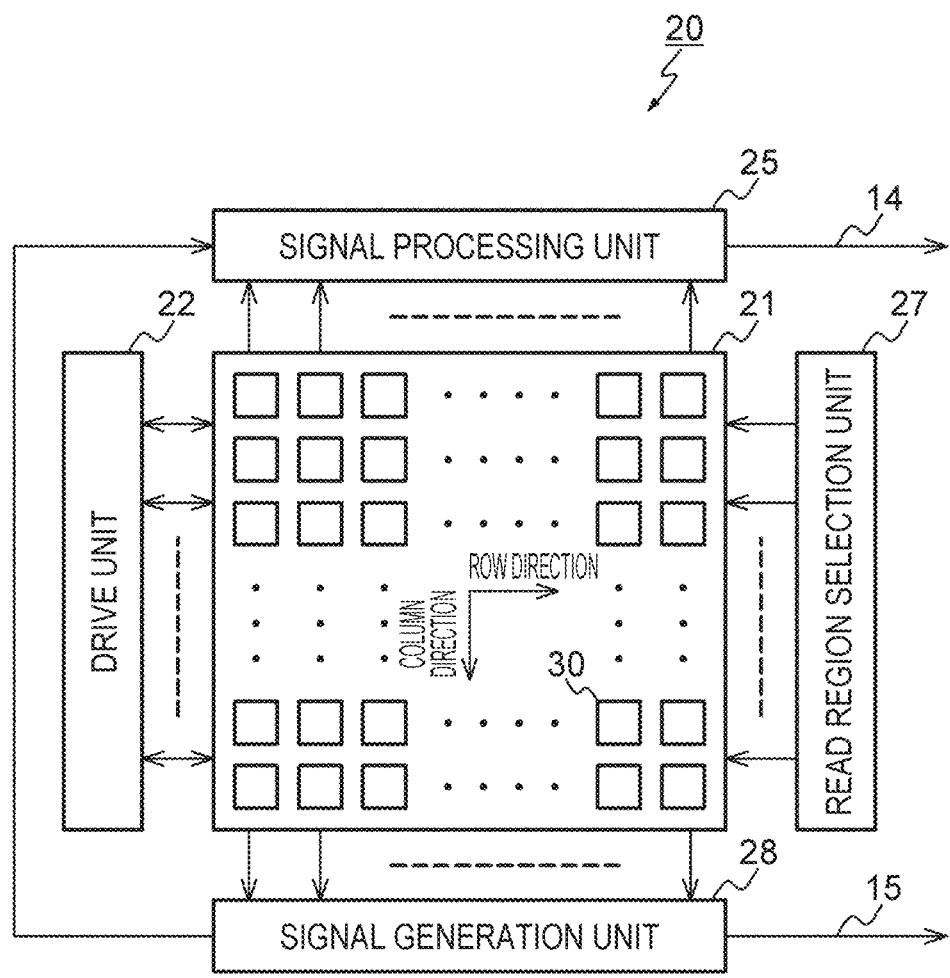
FIG. 9 is a block diagram illustrating an example of a configuration of an imaging device according to the second configuration example of the present disclosure.

FIG. 9 is a block diagram illustrating an example of a configuration of an imaging device according to the second configuration example, that is, a scanning type imaging device used as the imaging device 20 in the imaging system 10 to which the technology according to the present disclosure is applied.

As illustrated in FIG. 9, the imaging device 20 according to the second configuration example as the imaging device of the present disclosure includes the pixel array unit 21, the drive unit 22, the signal processing unit 25, a read region selection unit 27, and a signal generation unit 28.

The pixel array unit 21 includes a plurality of pixels 30. Each of the plurality of pixels 30 outputs an output signal in response to the selection signal of the read region selection unit 27. Each of the plurality of pixels 30 may include a quantizer in the pixel as illustrated in FIG. 7, for example. Each of the plurality of pixels 30 outputs an output signal associated with the amount of change in the intensity of light. The plurality of pixels 30 may be two-dimensionally disposed in a matrix as illustrated in FIG. 9.

The drive unit 22 drives each of the plurality of pixels 30 to output the pixel signal generated in each pixel 30 to the signal processing unit 25. Note that the drive unit 22 and the signal processing unit 25 are circuit units for acquiring gradation information. Therefore, in a case where only the event information is acquired, the drive unit 22 and the signal processing unit 25 may not be provided.

The read region selection unit 27 selects some of the plurality of pixels 30 included in the pixel array unit 21. For example, the read region selection unit 27 selects any one or a plurality of rows among the rows included in the structure of the two-dimensional matrix corresponding to the pixel array unit 21. The read region selection unit 27 sequentially selects one or a plurality of rows according to a preset cycle. In addition, the read region selection unit 27 may determine the selected region in response to a request from each pixel 30 of the pixel array unit 21.

On the basis of the output signal of the pixel selected by the read region selection unit 27, the signal generation unit 28 generates an event signal associated with the active pixel in which the event has been detected among the selected pixels. The event is an event in which the intensity of light changes. The active pixel is a pixel in which the amount of change in the intensity of light associated with the output signal exceeds or fails below a preset threshold value. For example, the signal generation unit 28 compares the output signal of the pixel with a reference signal, detects an active pixel that outputs the output signal in a case where the output signal is larger or smaller than the reference signal, and generates an event signal associated with the active pixel.

The signal generation unit 28 can include, for example, a column selection circuit that arbitrates a signal entering the signal generation unit 28. In addition, the signal generation an it 28 can be configured to output not only the information about the active pixel that has detected the event but also the information about the inactive pixel that has not detected the event.

The address information and the time stamp information (for example, (X, Y, T)) of the active pixel in which the event has been detected are output from the signal generation unit 28 through an output line 15. However, the data output from the signal generation unit 28 may be not only the address information and the time stamp information but also information in a frame format (for example, (0, 0, 1, 0, . . . )).
[Configuration Example of Chip Structure]

Figure 10:
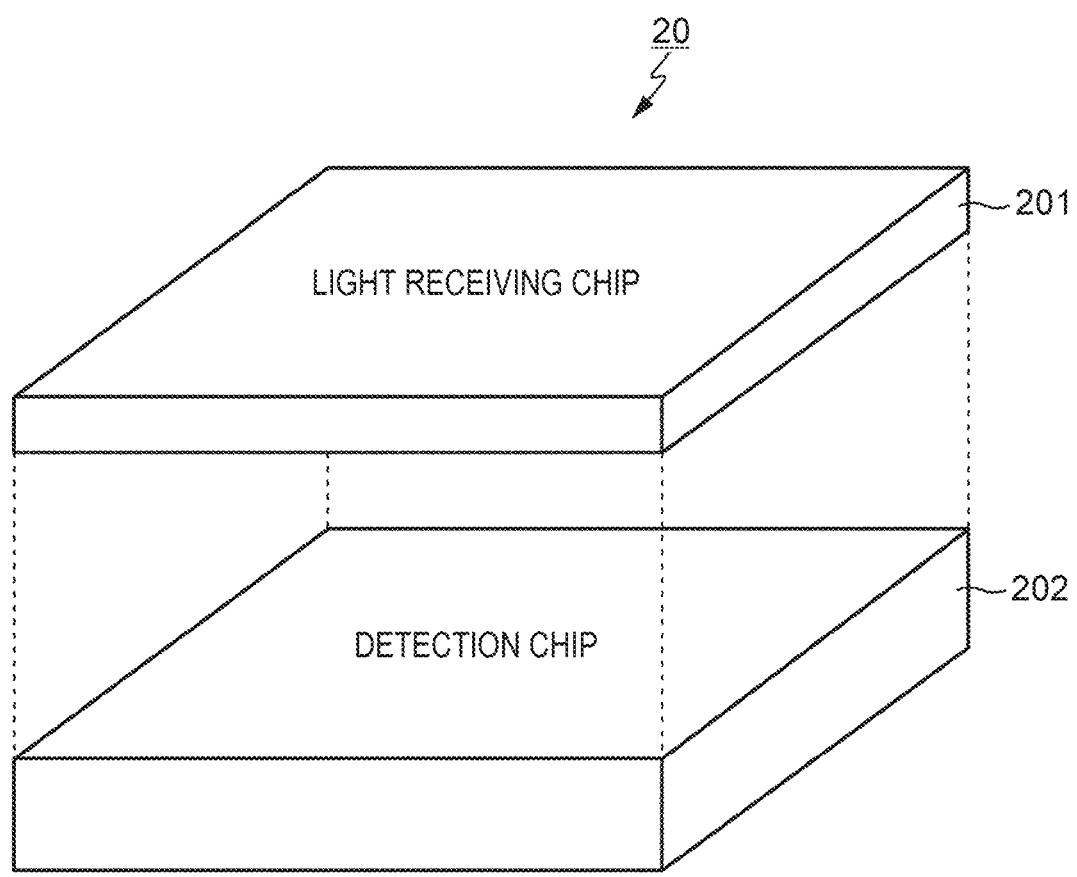
FIG. 10 is an exploded perspective view schematically illustrating a stacked chip structure of the imaging device.

A chip (semiconductor integrated circuit) structure of the imaging device 20 according to the first configuration example or the second configuration example described above can have, for example, a stacked chip structure. FIG. 10 is an exploded perspective view schematically illustrating a stacked chip structure of the imaging device 20.

As illustrated in FIG. 10, the stacked chip structure, that is, the stacked structure has a structure in which at least two chips of a light receiving chip 201 which is a first chip or a detection chip 202 which is a second chip are stacked. Then, in the circuit configuration of the pixel 30 illustrated in FIG. 4, each of the light receiving elements 311 is disposed on the light receiving chip 201, and all elements other than the light receiving element 311, elements of other circuit portions of the pixel 30, and the like are disposed on the detection chip 202. The light receiving chip 201 and the detection chip 202 are electrically connected via a connection portion such as a via (VIA), Cu—Cu bonding, or a bump.

Note that, here, a configuration example in which the light receiving element 311 is disposed on the light receiving chip 201, and elements other than the light receiving element 311, elements of other circuit portions of the pixel 30, and the like are disposed on the detection chip 202 has been exemplified, but the present invention is not limited to this configuration example.

For example, in the circuit configuration of the pixel 30 illustrated in FIG. 4, respective elements of the light receiving unit 31 may be disposed on the light receiving chip 201, and elements other than the light receiving unit 31, elements of other circuit portions of the pixel 30, and the like may be disposed on the detection chip 202. In addition, respective elements of the light receiving unit 31, and the reset transistor 321 and the floating diffusion layer 324 of the pixel signal generation unit 32 may be disposed on the light receiving chip 201, and the other elements may be disposed on the detection chip 202. Furthermore, some of the elements constituting the address event detector 33 together with respective elements of the light receiving unit 31 and the like may be disposed on the light receiving chip 201.

[Configuration Example of Column Processing Unit]

Figure 11:
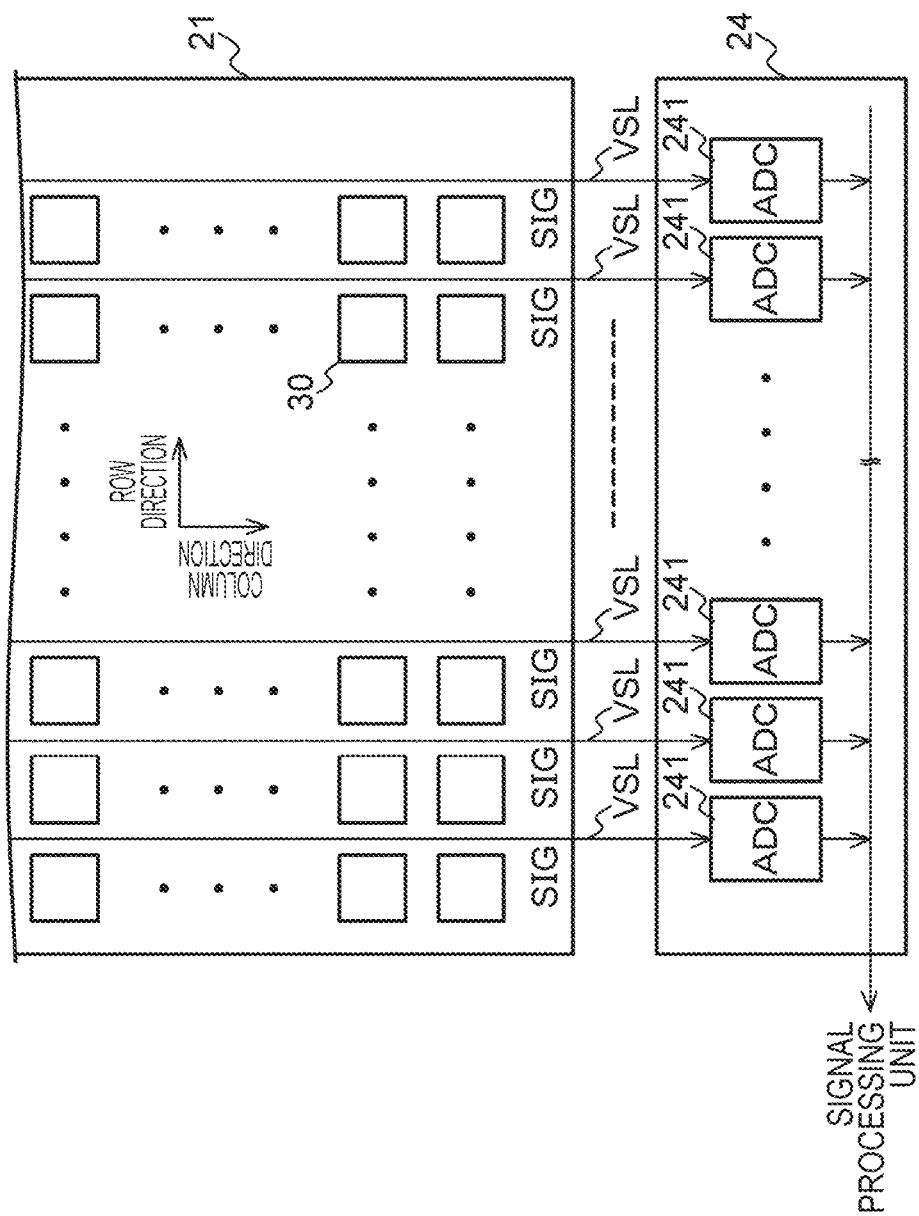
FIG. 11 is a block diagram illustrating an example of a configuration of a column processing unit of the imaging device according to the first configuration example.

FIG. 11 is a block diagram illustrating an example of a configuration of the column processing unit 24 of the imaging device 20 according to the first configuration example. As illustrated in FIG. 11, the column processing unit 24 according to the present example includes a plurality of analog-to-digital converters (ADC) 241 disposed for each pixel column of the pixel array unit 21.

Note that, here, a configuration example in which the analog-to-digital converter 241 is disposed in a one-to-one correspondence relationship with respect to the pixel column of the pixel array unit 21 has been exemplified, but the present invention is not limited to this configuration example. For example, the analog-to-digital converter 241 may be disposed in units of a plurality of pixel columns, and the analog-to-digital converter 241 may be used in a time division manner between the plurality of pixel columns.

The analog-to-digital converter 241 converts the analog pixel signal SIG supplied via the vertical signal line VSL into a digital signal having a larger number of bits than the detection signal of the address event described above. For example, when the detection signal of the address event is 2 bits, the pixel signal is converted into a digital signal of 3 bits or more (16 bits or the like). The analog-to-digital converter 241 supplies the digital signal generated by the analog-digital conversion to the signal processing unit 25.

First Embodiment

Figure 12:
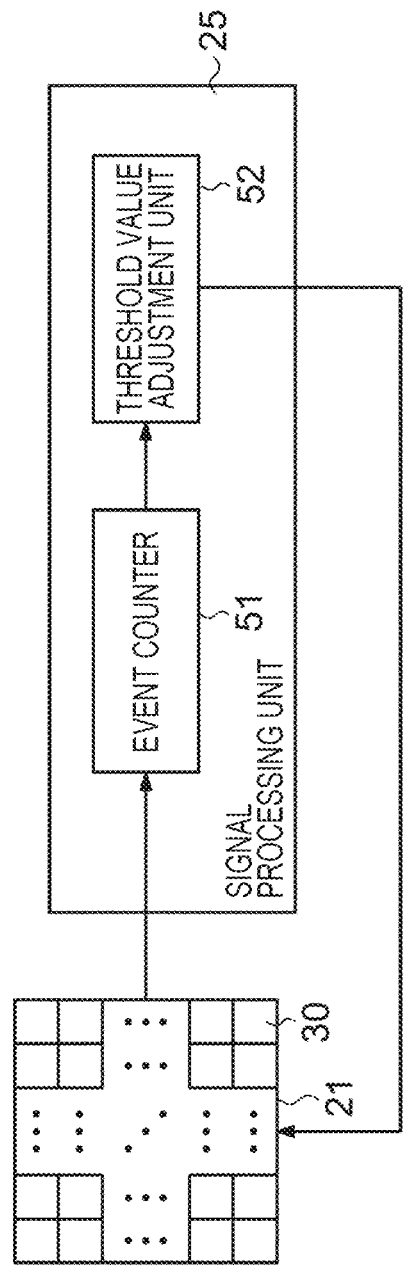
FIG. 12 is a block diagram illustrating an internal configuration of a signal processing unit according to the first embodiment.

FIG. 12 as a block diagram illustrating an internal configuration of the signal processing unit 25 according to the first embodiment. The signal processing unit 25 in FIG. 12 includes an event counter 51 and a threshold value adjustment unit 52. The event counter 51 counts the number of events. As will be described later, the event is detected when the luminance rapidly changes. It is conceivable to separately count the event in a case where the luminance rapidly increases and the event in a case where the luminance rapidly decreases. However, in the present embodiment, the event is counted without distinguishing the direction of the luminance change.

The threshold value adjustment unit 52 adjusts the threshold value on the basis of the event detection situation. The threshold value is a threshold value when the address event detector 33 in FIG. 4 detects the presence or absence of an address event. The event detection situation includes one of the number of event signals detected in a predetermined region within a predetermined period, a ratio of the number of address event detectors 33 that have output the event signals to the total number of address event detectors 33 in the predetermined region, and a signal level of the event signal.

Figure 13:
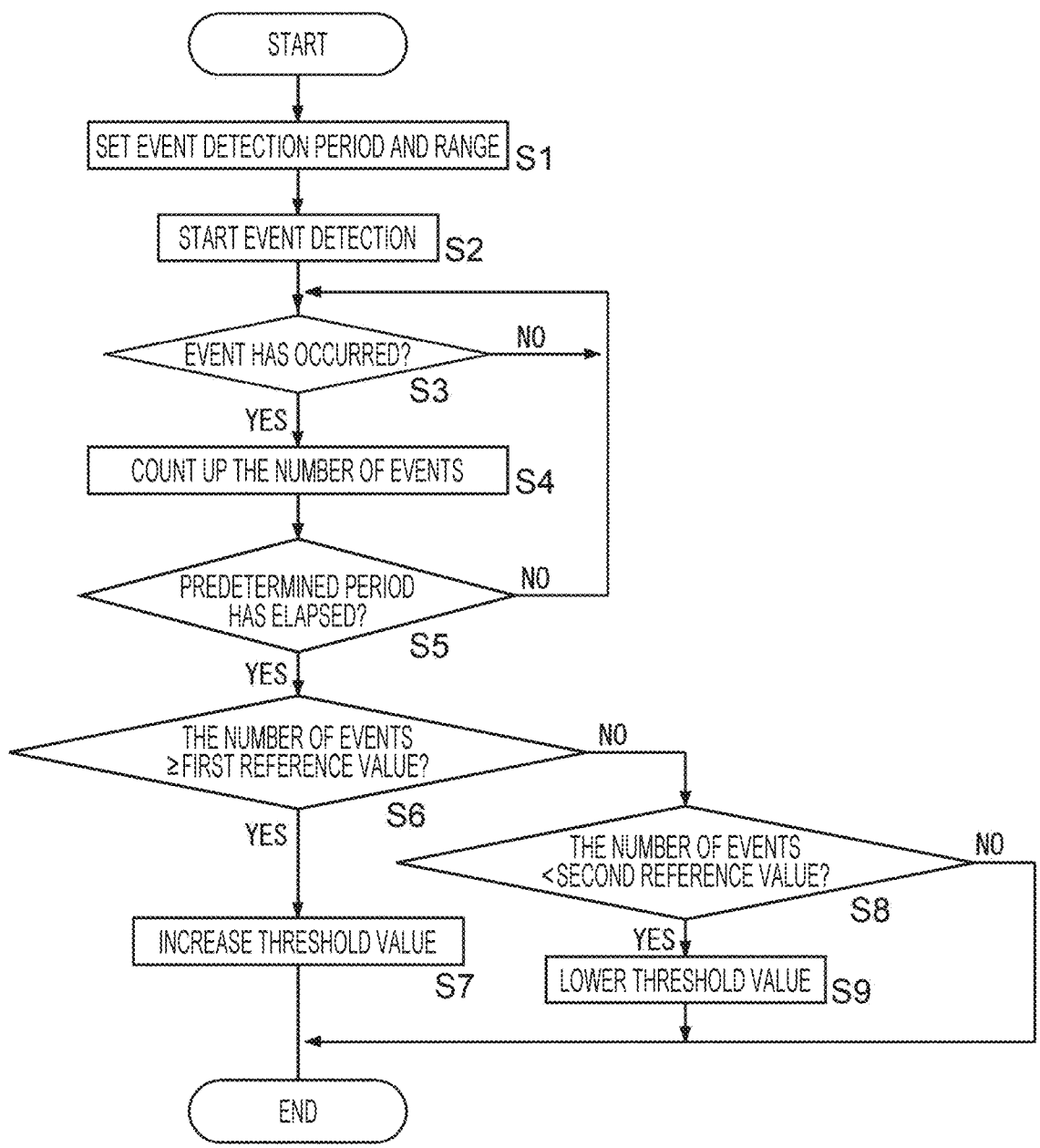
FIG. 13 is a flowchart illustrating processing operations of a pixel array unit and a signal processing unit according to the first embodiment.

FIG. 13 is a flowchart illustrating processing operations of the pixel array unit 21 and the signal processing unit 25 according to the first embodiment. First, a period and a range in which an event is detected are initially set (step S1). Then, the event detection by the pixel array unit 21 is started within the initially set predetermined range (step S2).

Next, it is determined whether or not an event has occurred (step S3). Here, in a case where an event detection signal is output from the pixel array unit 21, it is determined that an event has occurred. In a case where an event occurs, the count value (the number of events) of the event counter 51 is counted up (step S4).

Next, it is determined whether or not the predetermined period set in step S1 has elapsed (step S5). When the predetermined period has not elapsed, the processes in and after step S2 is repeated, and when it is determined that the predetermined period has elapsed, it is determined whether or not the number of events counted by the event counter 51 is greater than or equal to the first reference value (step S6). When it is greater than or equal to the first reference value, the threshold value for event detection in the address event detector 33 is increased in order to lower the event detection sensitivity of the address event detector 33 (step S7). The frequency of the event detected by the address event detector 33 decreases as the threshold value is increased.

When it is determined in step S6 that the number of events is less than the first reference value, it is determined whether or not the number of events is less than the second reference value (step S8). The second reference value is the same as or smaller than the first reference value. When the number of events is less than the second reference value, the threshold value for event detection is lowered in order to increase the event detection sensitivity of the address event detector 33 (step S9). As the threshold value is lowered, the frequency of the event detected by the address event detector 33 increases. The updated threshold value is notified to the address event detector 33 in the pixel array unit 21.

In the flowchart of FIG. 13, in a case where the number of events is less than the first reference value and equal to or greater than the second reference value, the threshold value of the address event detector 33 is kept as it is. Note that, as described above, the first reference value and the second reference value may be made equal to each other, so that the number of determination processes in the flowchart of FIG. 13 can be reduced, and the threshold value can be quickly adjusted.

Figure 14:
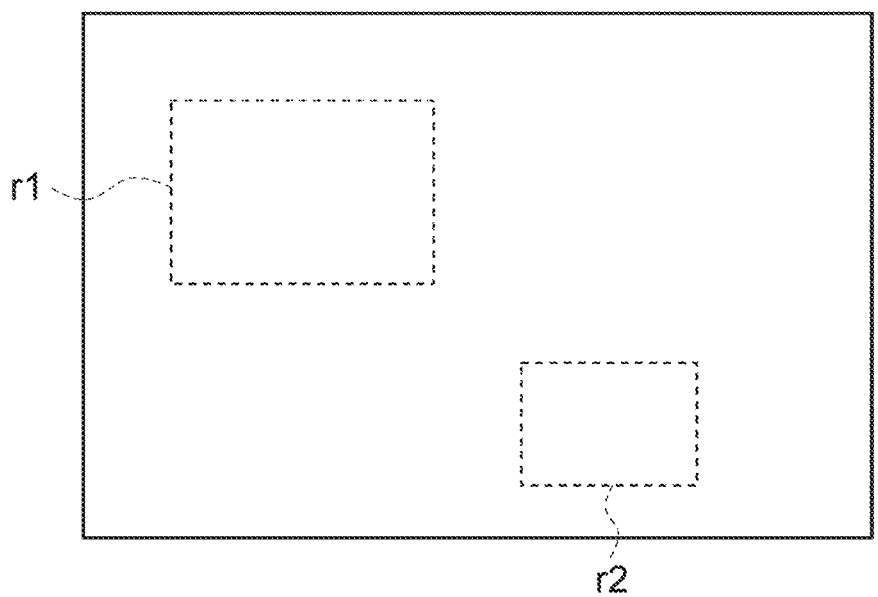
FIG. 14 is a diagram illustrating an example of setting a plurality of pixel regions in an imaging scene.

In step S1 of FIG. 13, the range in which the threshold value adjustment of the event is performed is initially set, but as illustrated in FIG. 14, the process of FIG. 13 may be separately performed for each of a plurality of pixel regions in the imaging scene captured at the angle of view of the imaging device 20, and the threshold value of the address event detector 33 may be separately set. For example, in a case where the detection situation of the event is significantly different between the pixel regions r1 and r2, the threshold value optimal for the pixel region r1 and the threshold value optimal for the pixel region r2 may be set as the threshold value in the address event detector 33.

In FIG. 13, the threshold value of the address event detector 33 is adjusted by the number of events, but the threshold value may be adjusted by the firing rate of the event or the signal level of the event signal. The firing rate of the event is a ratio of the number of pixels in which the event is detected among the number of pixels within the predetermined range initially set in step S1.

The method of counting the number of events by the event counter 51 in step S4 of FIG. 13 differs depending on whether the imaging device is in an asynchronous system or a synchronous system (scanning system).

Figure 15:
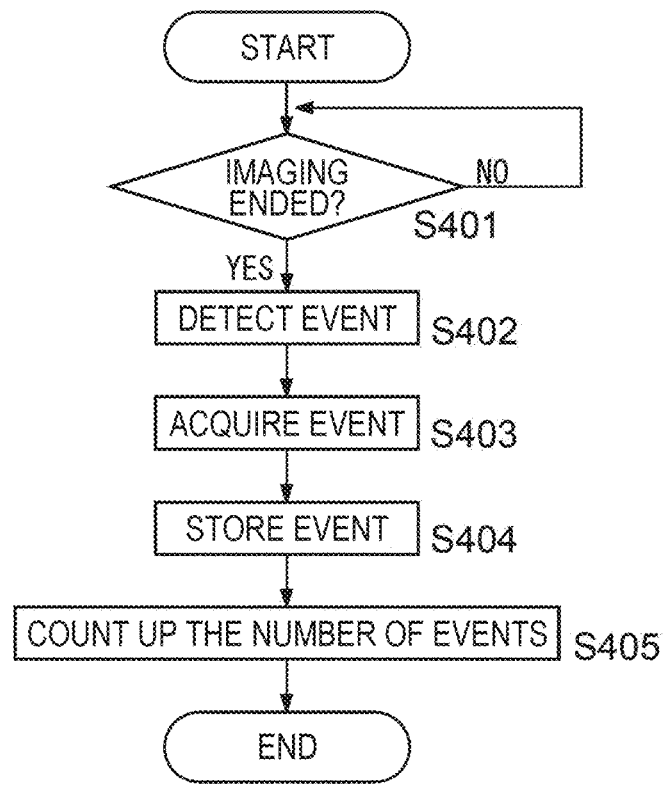
FIG. 15 is a flowchart illustrating an event count processing procedure in the imaging device of the scan method in FIG. 9.

FIG. 15 is a flowchart illustrating an event count processing procedure in the imaging device of the scan method in FIG. 9. First, the process waits until the imaging process for one frame by the pixel array unit is completed (step S401), and the output signal of each pixel is sequentially read. When an event signal is detected (step S402), the event signal is acquired (step S403) and stored (step S404). Next, all the stored event signals are counted by the event counter 51 (step S405).

Figure 16:
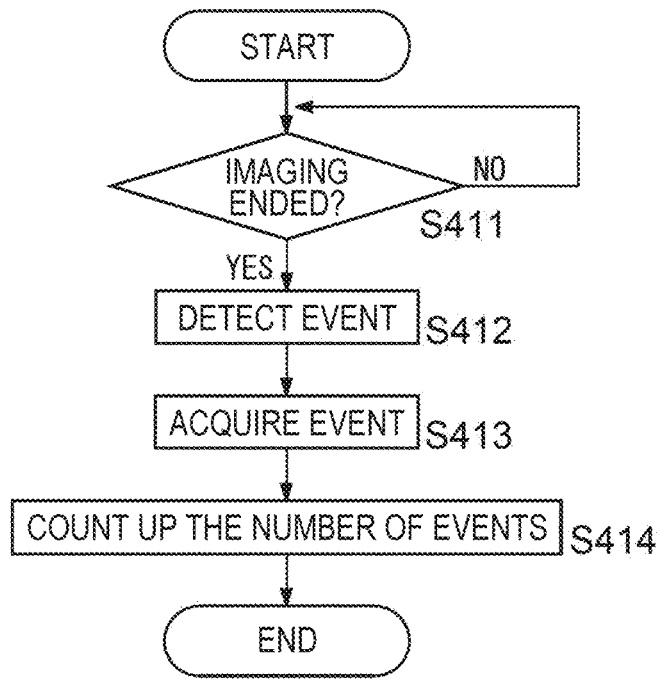
FIG. 16 is a flowchart illustrating a modification of an event count processing procedure in the scanning type imaging device of FIG. 9.

FIG. 16 is a flowchart illustrating a modification of the event count processing procedure in the imaging device of the scan method in FIG. 9. The flowchart of FIG. 16 is different from the process of FIG. 15 in that after waiting until the imaging process is finished (step S411), the number of events is counted by the event counter 51 (step S414) every time an event signal is detected and acquired (steps S412 and S413).

Figure 17:
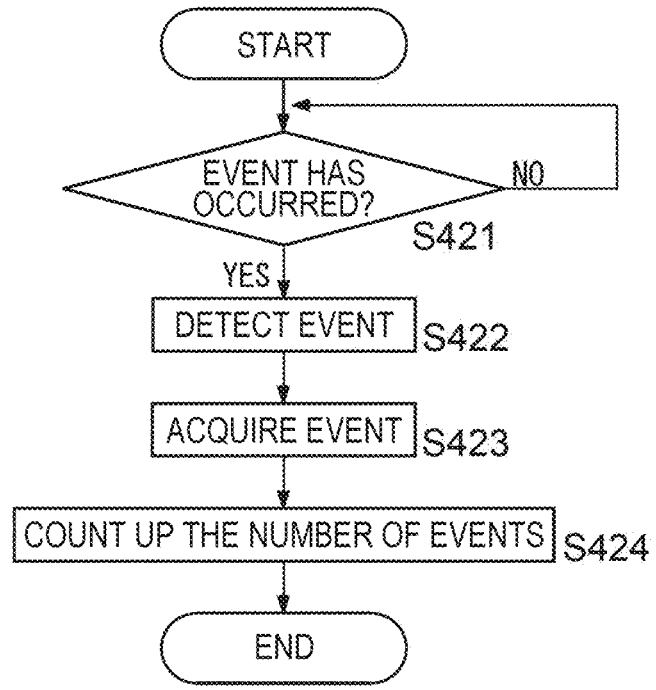
FIG. 17 is a flowchart illustrating an event count processing procedure in the asynchronous imaging device in FIG. 2.

FIG. 17 is a flowchart illustrating an event count processing procedure in the asynchronous imaging device in FIG. 2. FIG. 17 illustrates an example in which event detection is performed asynchronously in units of rows or pixels of the pixel array unit. First, the process waits until an event occurs (step S421). When the event is detected (step S422), the event is acquired (step S423), and the event counter 51 counts the event (step S424).

Figure 18:
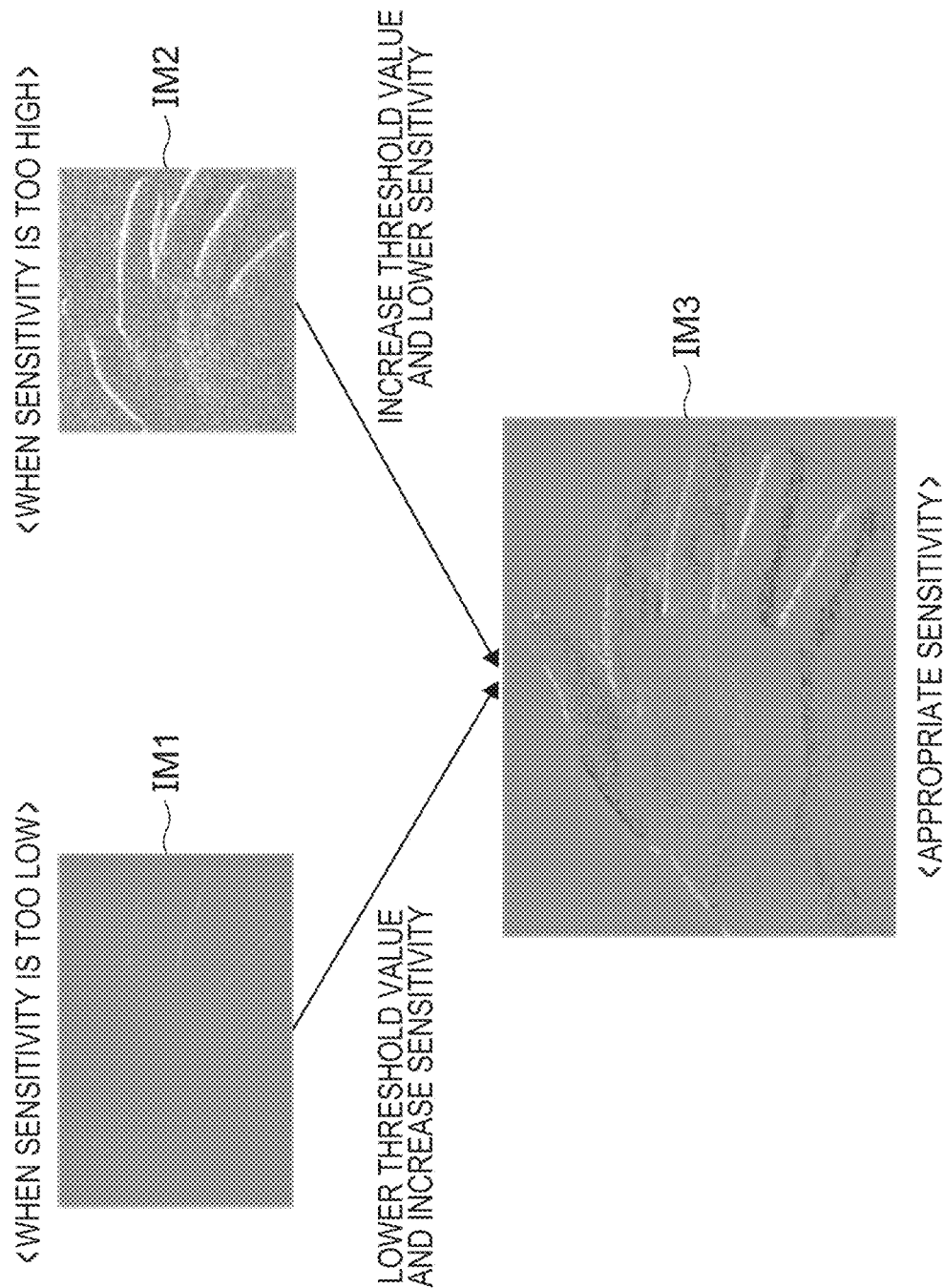
FIG. 18 is a diagram illustrating an example of a first captured image for adjusting a threshold value of an address event detector in a state where the entire imaging scene is initially set as a predetermined range.

FIG. 18 is a diagram illustrating a first captured image example of adjusting the threshold value of the address event detector 33 in a state where the entire imaging scene captured by the pixel array unit 21 is initially set as a predetermined range. The example of FIG. 18 illustrates a captured image of a human hand captured by the imaging device 20 in a dark place. A captured image IM1 in FIG. 18 illustrates an example in which the event detection sensitivity of the address event detector 33 is too low, and a captured image IM2 illustrates an example in which the event detection sensitivity is too high. Since the captured image IM1 has too low event detection sensitivity, almost no event is detected, and the captured image IM1 is almost completely dark. Since the captured image IM2 has too high event detection sensitivity, an event including noise is detected more than necessary, and the outline of the hand is unclear. The captured image IM3 is a captured image after the processing of FIG. 13 or 14 is performed. The outline of the hand is clear even in a dark place, and it can be seen that appropriate event detection sensitivity is set.

Figure 19:
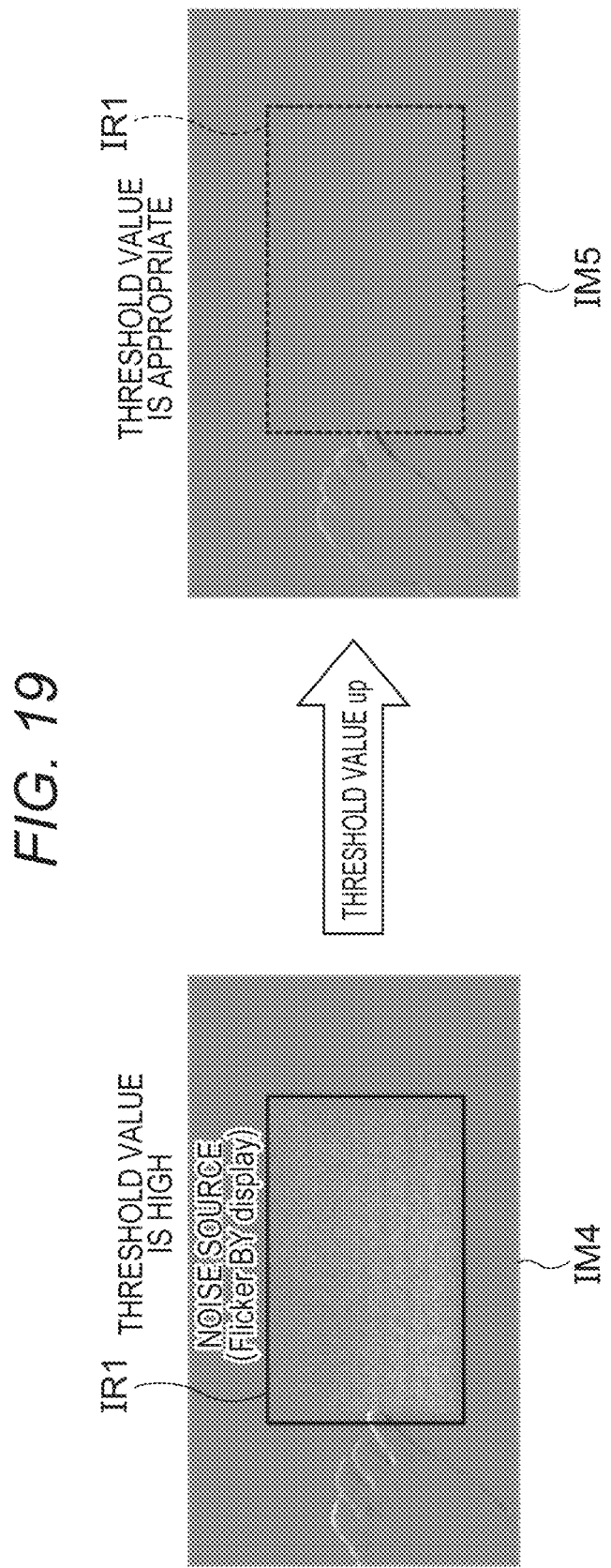
FIG. 19 is a diagram illustrating an example of a second captured image for adjusting a first reference value and a second reference value for a partial pixel region in an imaging scene.

FIG. 19 is a diagram illustrating a second captured image example in which the first reference value and the second reference value are adjusted for a partial pixel region in the imaging scene. A captured image IM4 is an example of a captured image in a case where the event detection sensitivity is too high. In a partial pixel region IR1 in the captured image IM4, for example, there is a flicker light source, and a large number of events occur. A human hand appears in the vicinity of the pixel region IR1. The tip portion of the human hand overlaps with the event due to flicker, and the tip portion of the human hand is particularly unclear.

A captured image IM5 is a captured image after the processing of FIG. 13 or 14 is performed in the pixel region IR1. By adjusting the first and second reference values so that the event detection sensitivity in the pixel region IR1 is low, the event in the pixel region IR1 is hardly detected. As a result, a captured image in which the contour of the human hand clearly appears is obtained even in a dark place.

As described above, in the first embodiment, since the threshold value of the address event detector 33 is adjusted on the basis of at least one of the number of events detected by the pixel array unit 21, the firing rate, or the detection signal level, optimal threshold value setting can be performed according to the event detection situation in the imaging scene. For example, in a case where there is a pixel region in which a large number of events are detected in the imaging scene, by increasing the threshold value in this pixel region to lower the event detection sensitivity, it is possible to reliably detect an important event in a state where an event due to noise such as flicker is removed.

Second Embodiment

When the event is detected by the address event detector 33, the event may be detected separately for a Pos event and a Neg event. The Pos event is an event that occurs when the absolute value of the amount of change in luminance when the luminance changes in a direction in which the luminance increases exceeds a first threshold value. The Neg event is an event that occurs when the absolute value of the amount of change in luminance when the luminance changes in the direction of decreasing the luminance exceeds a second threshold value. For example, in the case of the event caused by, the flicker, since a large number of Pos events and Neg events are alternately detected, it is possible to determine whether the event is caused by the flicker or the event is caused by other factors on the basis of the detection order and the number of times of detection of the Pos event and the Neg event.

A signal processing unit 25 according to the second embodiment described below has a block configuration similar to that in FIG. 12, but processing operations of the event counter 51 and the threshold value adjustment unit 52 are different from those in the first embodiment. The event counter 51 separately counts the number of Pos events and the number of Neg events. The threshold value adjustment unit 52 adjusts the threshold value for Pos event detection on the basis of the detection situation of the Pos event, and adjusts the threshold value for Neg event detection on the basis of the detection situation of the Neg event.

As described above, the address event detector 33 according to the present embodiment includes the first detector and the second detector. The first detector detects the first detection signal in a case where an absolute value of an amount of change when the photoelectrically converted electric signal changes in an increasing direction exceeds the first threshold value. The second detector detects the second detection signal in a case where an absolute value of an amount of change when the photoelectrically converted electric signal changes in a decreasing direction exceeds the second threshold value. The threshold value adjustment unit 52 adjusts the first threshold value and the second threshold value on the basis of the detection situations of the first detector and the second detector.

In addition, the signal processing unit 25 according to the present embodiment includes a first determination unit and a second determination unit. The first determination unit determines whether or not the detection situation in the first detector is within a first allowable range. The second determination unit determines whether or not the detection situation in the second detector is within a second allowable range. The threshold value adjustment unit adjusts the first threshold value in a case where the first determination unit determines that it is not within the first allowable range, and adjusts the second threshold value in a case where the second determination unit determines that it is not within the second allowable range.

Figure 20:
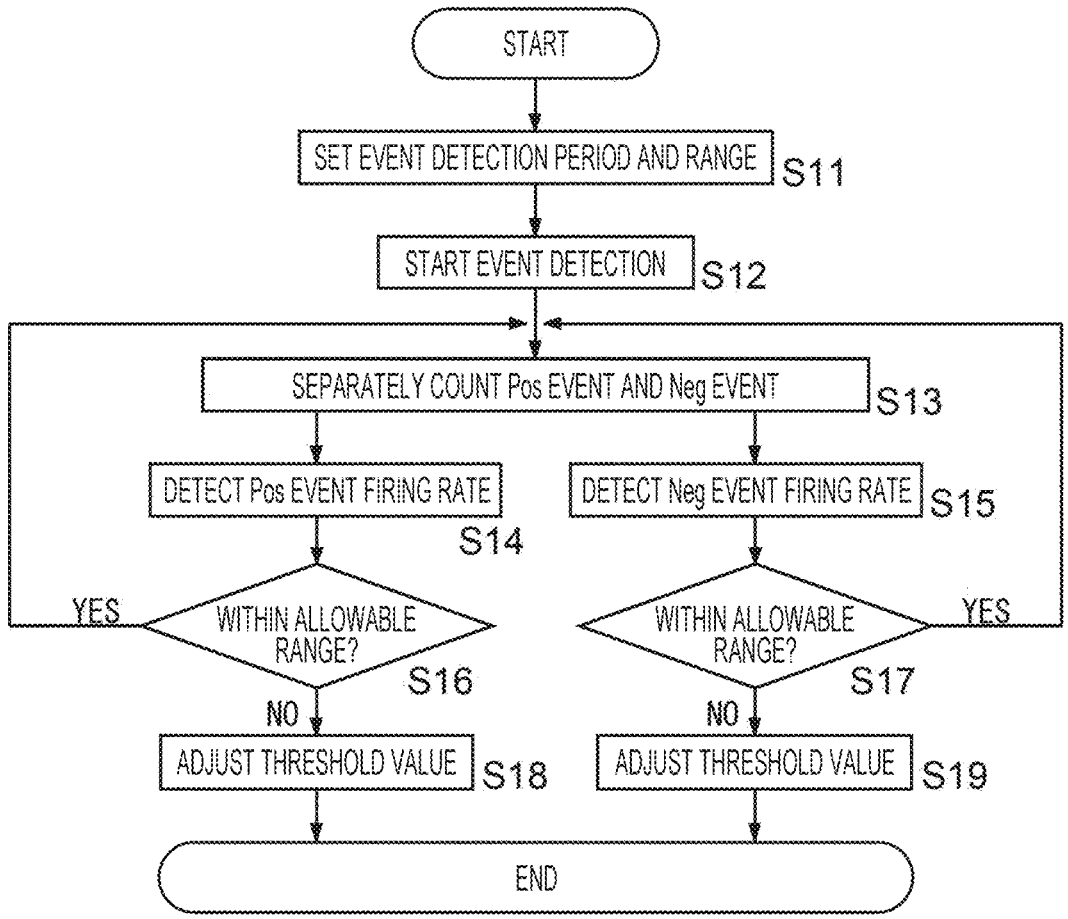
FIG. 20 is a flowchart illustrating a processing operation of a signal processing unit according to a second embodiment.

FIG. 20 is a flowchart illustrating a processing operation of the signal processing unit 25 according to the second embodiment. First, a period and a range in which an event is detected are initially set (step S11). Then, the address event detector 33 starts the event detection in the pixel array unit 21 within the initially set predetermined range (step S12). The address event detector 33 separately detects and outputs the Pos event and the Neg event.

The event counter 51 separately counts the Pos event and the Nag event (step S13). When the Pos event and the Neg event are detected, it is necessary to change the processing procedure of counting the number of events as illustrated in FIGS. 15 to 17 depending on whether the imaging device 20 is of the synchronous type (scan type) or the asynchronous type.

The event detection is continued until the predetermined period initially set in step S11 elapses, and when the predetermined period elapses, the threshold value adjustment unit 52 detects the firing rate of the Pos event (step S14) and detects the firing rate of the Neg event (step S15). The firing rate is a ratio of the number of pixels in which the Pos event (Neg event) is detected among the number of pixels within the predetermined range initially set in step S11.

Figure 21:
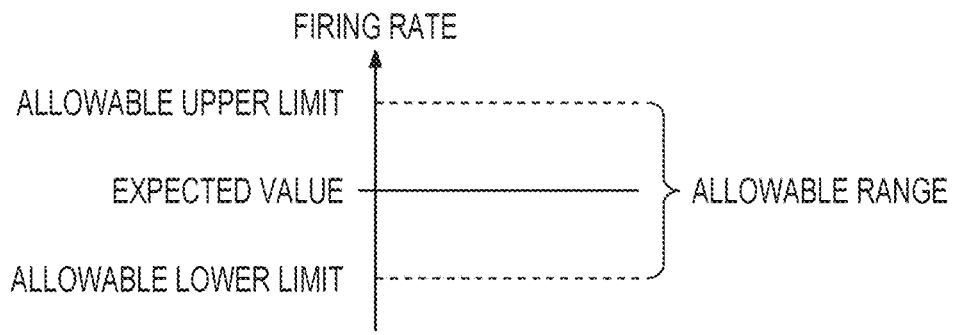
FIG. 21 is a diagram for explaining an allowable range.

Next, it is determined whether or not the firing rate of the Pos event is within the allowable range (step S16), and it is determined whether or not the firing rate of the Neg event is within the allowable range (step S17). As illustrated in FIG. 21, the allowable range is a range between the allowable upper limit and the allowable lower limit of the firing rate around the expected value of the firing rate. The allowable range of the firing rate of the Pos event and the allowable range of the firing rate of the Neg event may be the same or different.

When it is determined in step S16 that the firing rate of the Pos event is not within the allowable range, the threshold value for the Pos event is adjusted so that the firing rate of the Pos event falls within the allowable range (step S18). This threshold value is a threshold value for the Pos event in the address event detector 33. Similarly, the threshold value for the Peg event is adjusted so that the firing rate of the Neg event falls within the allowable range (step S19).

In the flowchart of FIG. 20, it is determined whether or not the firing rate of the Pos event (Neg event) is within the allowable range. However, instead of the firing rate, it may be determined whether or not the number of Pos events (Peg events) or the detection signal level is within the allowable range. Alternatively, it may be determined whether or not the event detection result in the CPU or the like disposed on the subsequent stage of the signal processing unit 25 is within the allowable range.

As described above, in the second embodiment, the firing rate and the like of the Pos event and the Neg event are detected separately for the Pos event and the Neg event, and when the firing rate and the like are not within the allowable range, the threshold value for event detection is adjusted. As a result, the threshold value for the Pos event and the threshold value for the Neg event can be optimized. The present embodiment is effective in a case where an event that changes in a direction in which the luminance increases and an event that changes in a direction in which the luminance decreases exist separately. By separately handling the Pos event and the Neg event and performing a threshold value adjustment, an optimum number of both the Pos events and the Peg events can be detected.

Third Embodiment

Figure 22:
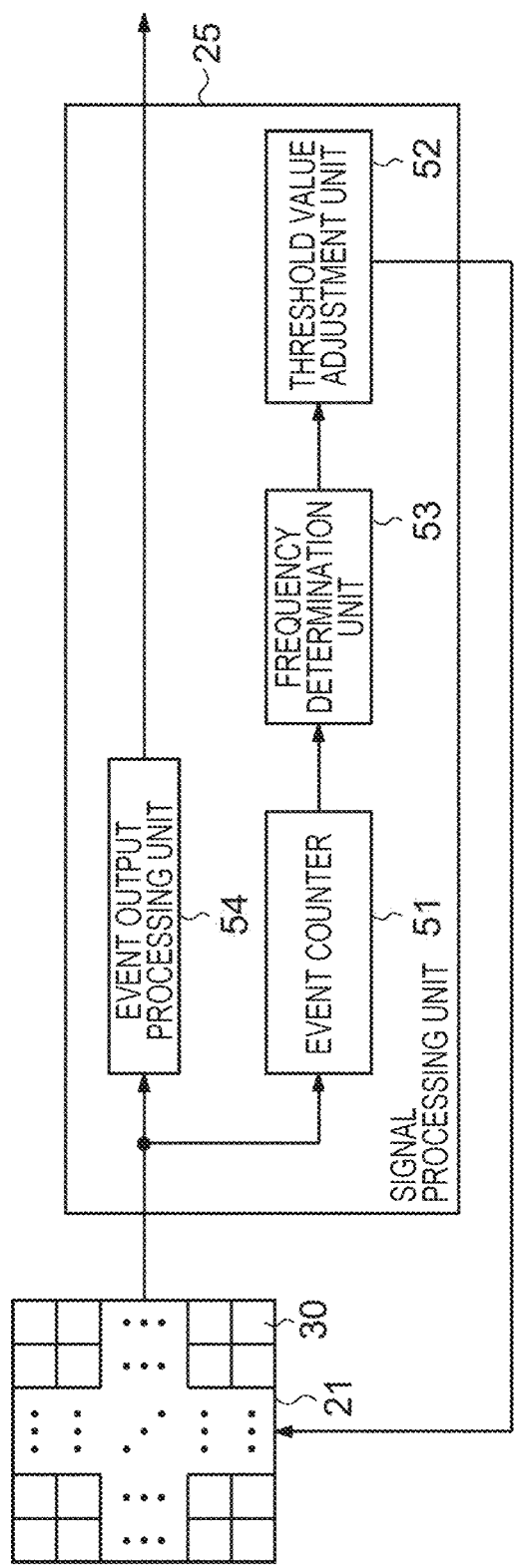
FIG. 22 is a block diagram illustrating an internal configuration of a signal processing unit according to a third embodiment.

In the third embodiment, the threshold value is adjusted on the basis of the detection frequency of the event. FIG. 22 is a block diagram illustrating an internal configuration of the signal processing unit 25 according to the third embodiment. The signal processing unit 25 in FIG. 22 includes a frequency determination unit 53 and an event output processing unit 54 in addition to the configuration of the signal processing unit 25 in FIG. 12. The frequency determination unit 53 calculates the detection frequency of the event on the basis of the number of events counted by the event counter 51, and compares the calculated detection frequency with the first reference value and the second reference value as in FIGS. 13 and 14.

The event output processing unit 54 performs noise removal processing included in the event signal output from the pixel array unit 21, signal level adjustment processing, and the like to output the event signal. The output event signal is input to, for example, a central processing unit (CPU) and the like illustrated in FIG. 1.

Figure 23:
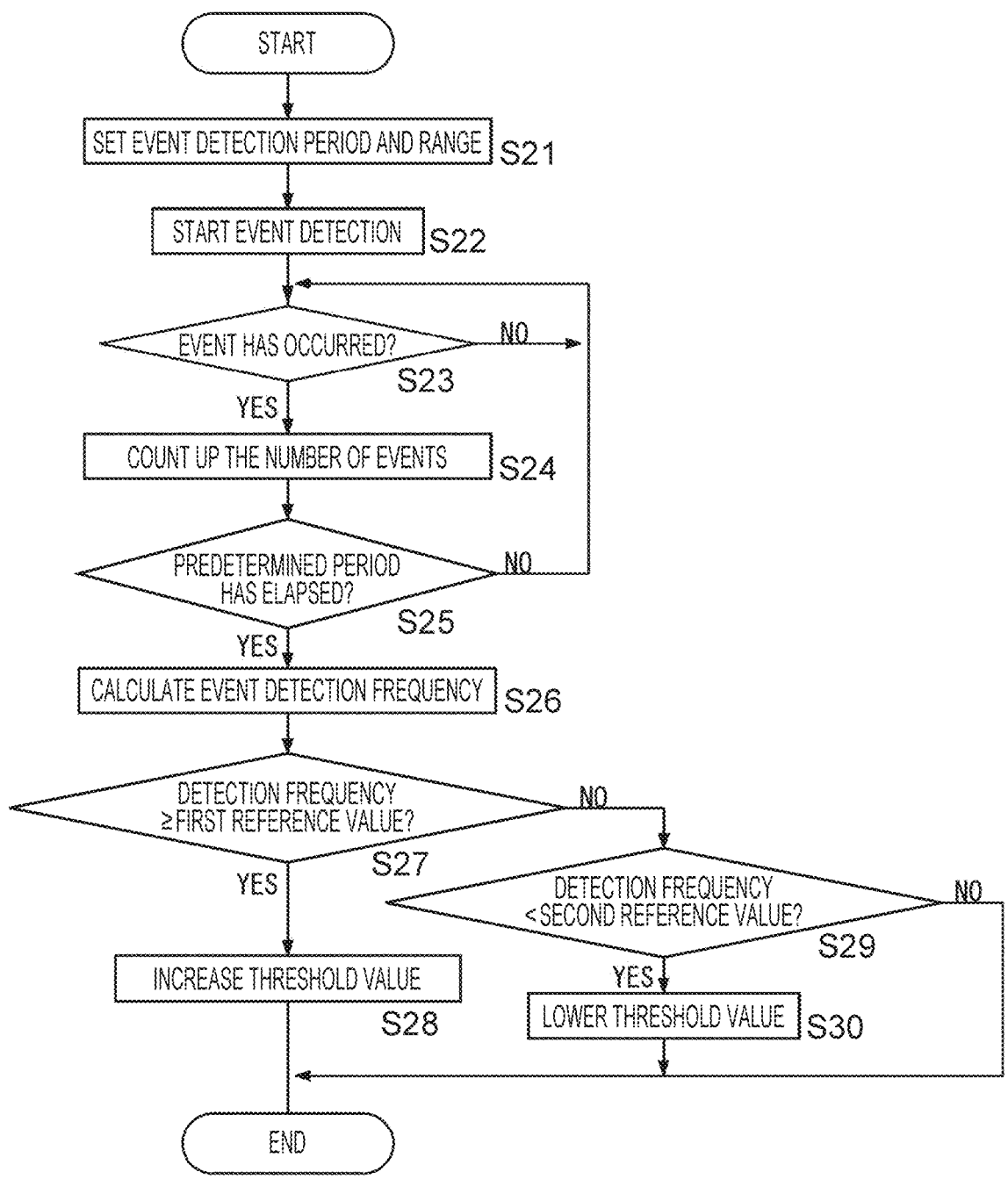
FIG. 23 is a flowchart of a processing operation of a signal processing unit according to the third embodiment.

FIG. 23 is a flowchart of a processing operation of the signal processing unit 25 according to the third embodiment. The processing in steps S21 to S25 is similar to the processing in steps S1 to S5 in FIG. 13. When it is determined that the predetermined period has elapsed, the detection frequency of the event within the predetermined range initially set in step S2 is calculated (step S26). The detection frequency may be calculated on the basis of a value obtained by dividing the number of events counted by the event counter 51 by a predetermined range or a predetermined period.

It is determined whether or not the event detection frequency calculated in step S26 is greater than or equal to the first reference value (step S27). When it is greater than or equal to the first reference value, the threshold value for event detection in the address event detector 33 is increased in order to lower the event detection sensitivity of the address event detector 33 (step S28).

When it is determined in step S27 that the detected value is less than the first reference value, it is determined whether or not the event detection frequency is less than the second reference value (step S29). The second reference value is the same as or smaller than the first reference value. When the event detection frequency is less than the second reference value, the threshold value is lowered in order to increase the event detection sensitivity of the address event detector 33 (step S30). The updated threshold value is notified to the address event detector 33 in the pixel array unit 21.

As described above, in the third embodiment, since the threshold value for event detection in the address event detector 33 is adjusted on the basis of the event detection frequency, the threshold value can be set so that the event detection frequency is in an optimal state.

Fourth Embodiment

In the fourth embodiment, object recognition is performed by a CPU connected to the signal processing unit 25.

Figure 24:
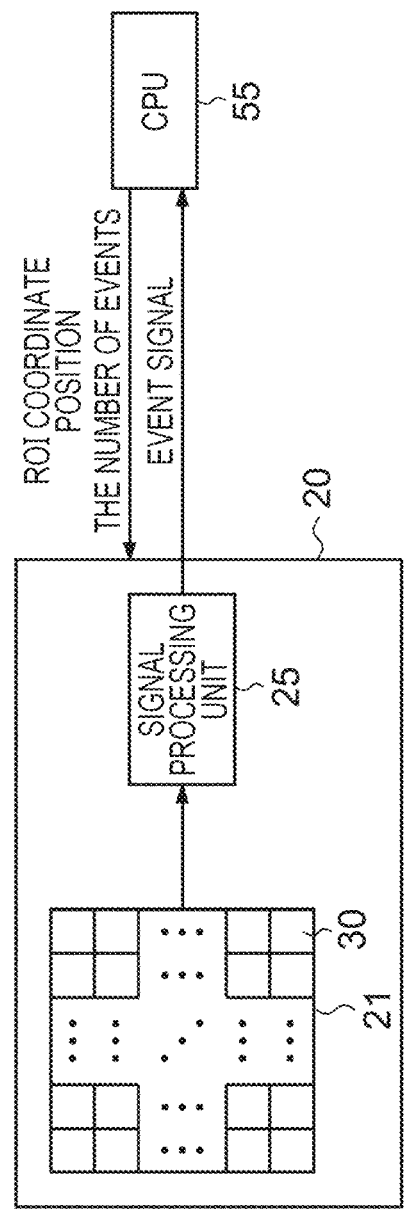
FIG. 24 is a block diagram illustrating a connection relationship between a signal processing unit and a CPU according to a fourth embodiment.

FIG. 24 is a block diagram illustrating a connection relationship between the signal processing unit 25 and the CPU 55 according to the fourth embodiment. As illustrated in FIG. 1, the CPU 55 may be provided separately from the imaging device 20 or may be provided inside the imaging device 20. The CPU 55 is a concept including an application processor (AP), a digital signal processor (DSP), an image signal processor (ISP), and the like mounted on a smartphone or the like.

The CPU 55 functions as a region extraction unit configured to extract a partial region within the imaging angle of view of the pixel array unit 21 on the basis of the detection situation of the event signal from the address event detector 33. The partial region is a partial pixel region in the imaging scene, and is referred to as a region of interest (ROI). The ROI is, for example, a region where an event is detected in addition, the CPU 55 also functions as an object recognition unit configured to recognize an object included in the imaging scene on the basis of the detection situation of the event signal. The above-described ROI is set as a region including the recognized object. In addition, the CPU 55 also functions as a notification unit configured to notify the signal processing unit 25 or the pixel array unit 21 of information about the coordinate position of the ROI.

The signal processing unit 25 transmits the event signal output from the pixel array unit 21 to the CPU 55. The CPU 55 recognizes an object present in the imaging scene imaged by the pixel array unit 21 on the basis of the event signal. Then, a pixel region including the object is set as the ROI. The CPU 55 transmits information about the coordinate position of the ROI in the imaging scene to the signal processing unit 25. The signal processing unit 25 notifies the pixel array unit 21 of information about the coordinate position of the ROI. The pixel array unit 21 performs photoelectric conversion only on pixels in the ROI, and only the corresponding address event detector 33 outputs an event signal. As described above, since the pixel array unit 21 can limit the pixel region where the event detection is performed, the power consumption of the pixel array unit 21 can be reduced.

Further, the CPU 55 may transmit the desired number of events to be detected by the address event detector 33 together with information about the coordinate position of the ROI to the pixel array unit 21. In this case, the address event detector 33 not only sets the range in which the event is detected on the basis of information about the coordinate position of the ROI transmitted from the CPU 55, but also adjusts the threshold value of the address event detector 33 so that the event signals of the number of events transmitted from the CPU 55 can be output.

Figure 25:
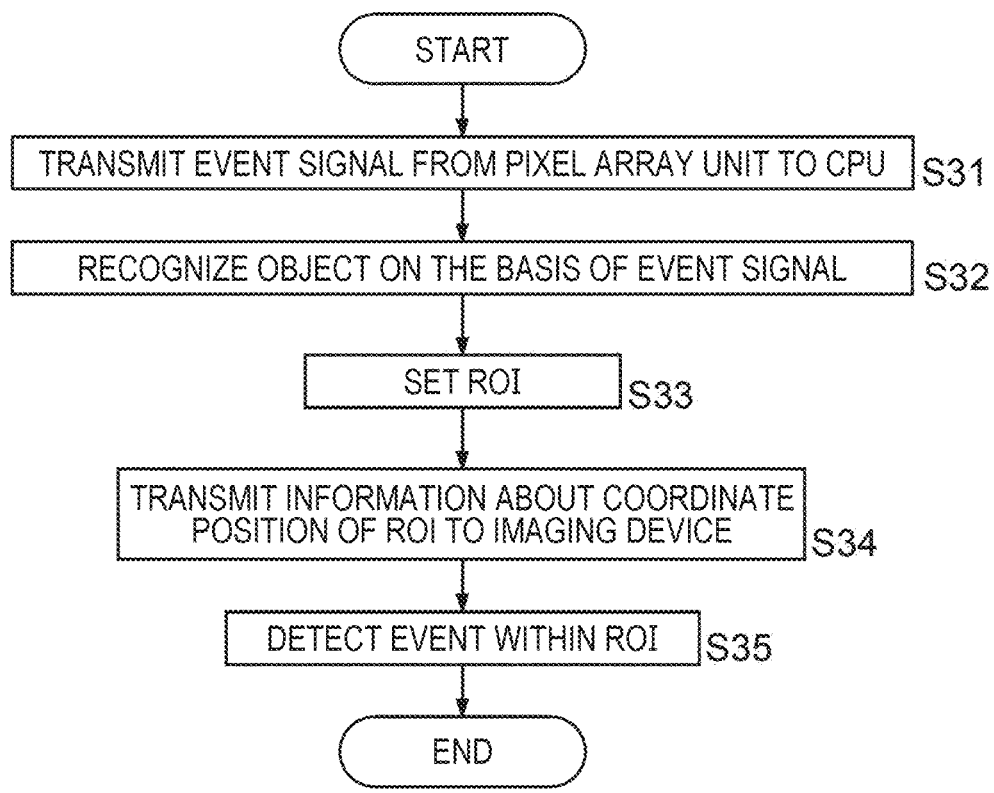
FIG. 25 is a flowchart showing processing operations of the signal processing unit and the CPU in FIG. 24.

FIG. 25 is a flowchart illustrating processing operations of the signal processing unit 25 and the CPU 55 in FIG. 24. The signal processing unit 25 transmits the event signal received from the pixel array unit 21 to the CPU 55 (step S31). The CPU 55 recognizes an object in the imaging scene on the basis of the event signal (step S32). Since the contour shape of the object can be grasped by the event signal, the object can be recognized by known pattern matching processing or the like. In a case where there is a plurality of objects in the imaging scene, the CPU 55 may recognize the plurality of objects.

Next, the CPU 55 sets a pixel region including an object in the imaging scene as an ROI (step S33). The ROI is, for example, a rectangular pixel region. In a case where a plurality of objects is recognized in the imaging scene, a plurality of ROIs may be set.

Next, the CPU 55 transmits information about the coordinate position of the ROI in the imaging scene to the imaging device 20 (more specifically, the signal processing unit 25) (step S34). The signal processing unit 25 notifies the pixel array unit 21 of information about the coordinate position of the ROI. Note that information about the coordinate position of the ROI may be directly transmitted from the CPU 55 to the pixel array unit 21 without through the signal processing unit 95.

The address event detector 33 in the pixel array unit 21 detects an event within the range of the ROI on the basis of information about the coordinate position of the ROI (step S35). As a result, the range in which the pixel array unit 21 performs event detection can be limited, the event detection processing of the pixel array unit 21 can be speeded up, and the power consumption of the pixel array unit 21 can be reduced.

In addition, in a case where the information about the number of events is transmitted from the CPU 55, the pixel array unit 21 detects the event after adjusting the threshold value of the address event detector 33 so that the number of detected events is as instructed by the CPU 55.

Figure 26:
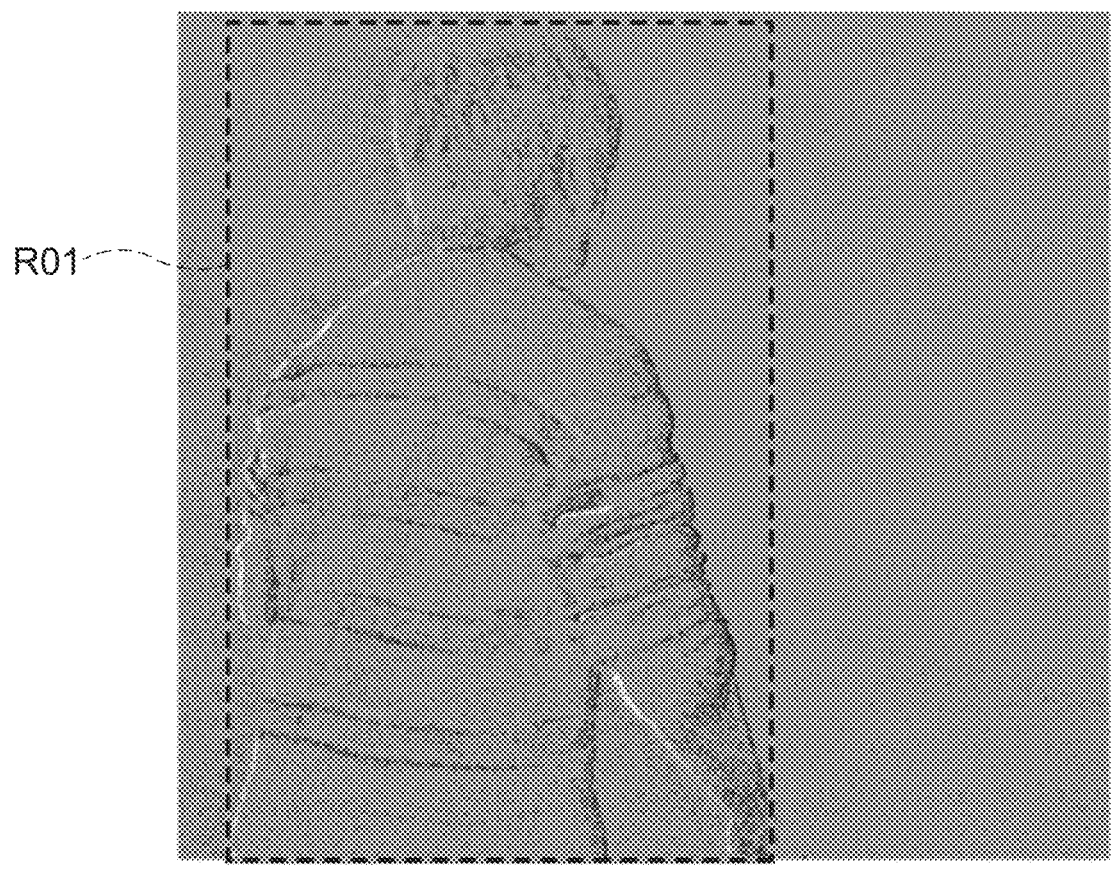
FIG. 26 is a diagram illustrating an example of an object included in an imaging scene.

FIG. 26 is a diagram illustrating an example of an object included in an imaging scene. FIG. 26 illustrates an image generated on the basis of an event detected in a dark place. The captured image in FIG. 26 is dark as a whole, but the outline portion of the object is clear by the luminance difference. The CPU 55 can recognize the object from the shape of the contour of the object in the captured image. Then, the CPU 55 sets a rectangular pixel region in accordance with the contour of the object, and sets this pixel region as the ROI.

As described above, in the fourth embodiment, the CPU 55 performs object recognition and sets the ROI on the basis of the event signal output from the pixel array unit 21. Thereafter, the pixel array unit 21 detects the event within the range of the ROI set by the CPU 55, the event can be detected at high speed and low power consumption. In addition, the CPU 55 can designate the number of events to be output from the pixel array unit 21, and the threshold value of the address event detector 33 can be controlled by the CPU 55.

Fifth Embodiment

In the fifth embodiment, the CPU 55 command the pixel array unit 21 to perform a predetermined operation according to the occurrence situation of the event.

Figure 27:
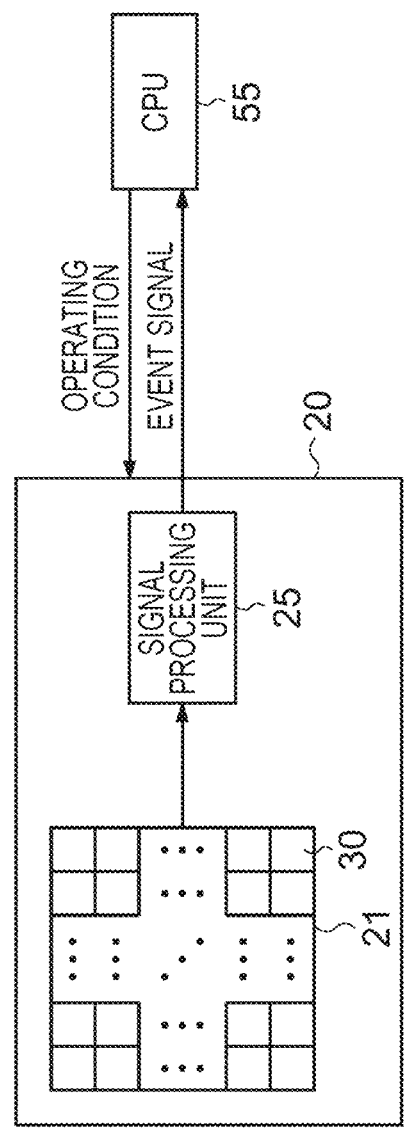
FIG. 27 is a block diagram illustrating a connection relationship between a signal processing unit and a CPU according to a fifth embodiment.

FIG. 27 is a block diagram illustrating a connection relationship between the signal processing unit 25 and the CPU 55 according to the fifth embodiment. As in FIG. 24, the CPU 55 may be provided separately from the imaging device 20 or may be provided inside the imaging device 20. As in FIG. 24, the CPU 55 is a concept including an AP, a DSP, an ISP, or the like. The CPU 55 transmits information about the operating condition of the pixel array unit 21 in the imaging device 20 on the basis of the event signal transmitted from the signal processing unit 25.

The CPU 55 in FIG. 27 functions as an information processing unit configured to generate operating condition information including at least one of a frame rate (photoelectric conversion speed) of the pixel array unit 21, a thinning rate of pixels that perform photoelectric conversion, or an activation frequency at which the pixel array unit 21 performs photoelectric conversion, on the basis of a detection situation of an event.

Figure 28:
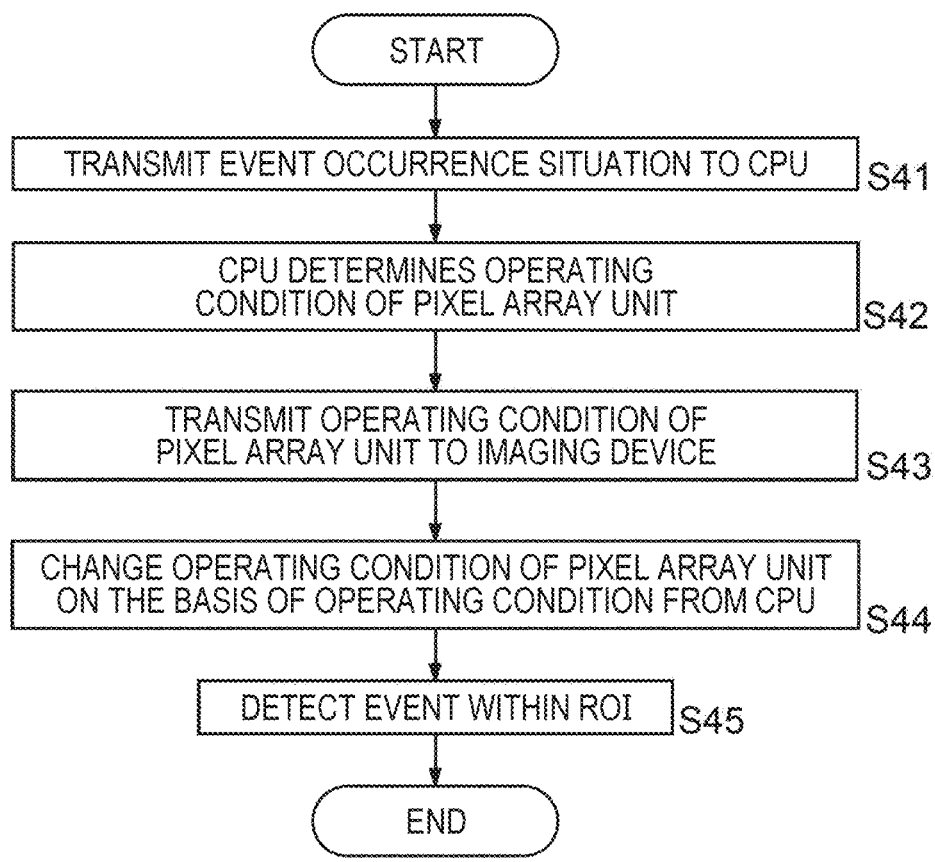
FIG. 28 is a flowchart showing processing operations of the signal processing unit and the CPU is FIG. 27.

FIG. 28 is a flowchart illustrating processing operations of the signal processing unit 25 and the CPU 55 in FIG. 27. The signal processing unit 25 transmits the signal, indicating the event occurrence situation, transmitted from the pixel array unit 21 to the CPU 55 (step S41). The signal indicating the event occurrence situation may be any of the number of events, the event detection frequency, the firing rate described above, and the event signal level.

The CPU 55 determines the operating condition of the pixel array unit 21 on the basis of the signal indicating the occurrence situation of the event (step S42). For example, as the occurrence frequency of the event decreases, the cycle (frame rate) in which the event detection is performed in the pixel array unit 21 may be lengthened, or the pixels in which the event detection is performed in the pixel array unit 21 may be thinned out. Alternatively, as the occurrence frequency of the event decreases, the frequency of activating the pixel array unit 21 may be further reduced. Conversely, as the occurrence frequency of the event is higher, the frame rate of the pixel array unit 21 may be increased, the number of pixels for performing event detection may be increased, or the activation speed of the pixel array unit 21 may be increased.

Next, the CPU 55 transmits the determined operating condition of the pixel array unit 21 to the imaging device 20 (for example, the signal processing unit 25 or the pixel array unit 21) (step S43). The pixel array unit 21 changes the setting on the basis of the operating condition of the pixel array unit 21 determined by the CPU 55 (step S44). Specifically, it changes the frame rate of the pixel array unit 21, performs pixel thinning processing for event detection, and changes the activation speed of the pixel array unit 21.

As described above, in the fifth embodiment, since the operating condition of the pixel array unit 21 is set by the CPU 55 according to the event occurrence situation, the power consumption of the pixel array unit 21 can be reduced by lowering the frame rate of the pixel array unit 21 or thinning out the pixels detecting the event in a case where the event occurrence frequency is low, for example. Conversely, in a case where the occurrence frequency of the event is high, the event can be detected quickly and accurately by increasing the frame rate of the pixel array unit 21 or increasing the number of pixels capable of detecting the event, for example. In addition, according to the present embodiment, since the CPU 55 provided separately from the signal processing unit 25 can change setting of the operating condition of the pixel array unit 21, the operation of the pixel array unit 21 can be finely controlled according to the situation.

Sixth Embodiment

In the sixth embodiment, the ROI is set not by the CPU 55 but by the signal processing unit 25.

Figure 29:
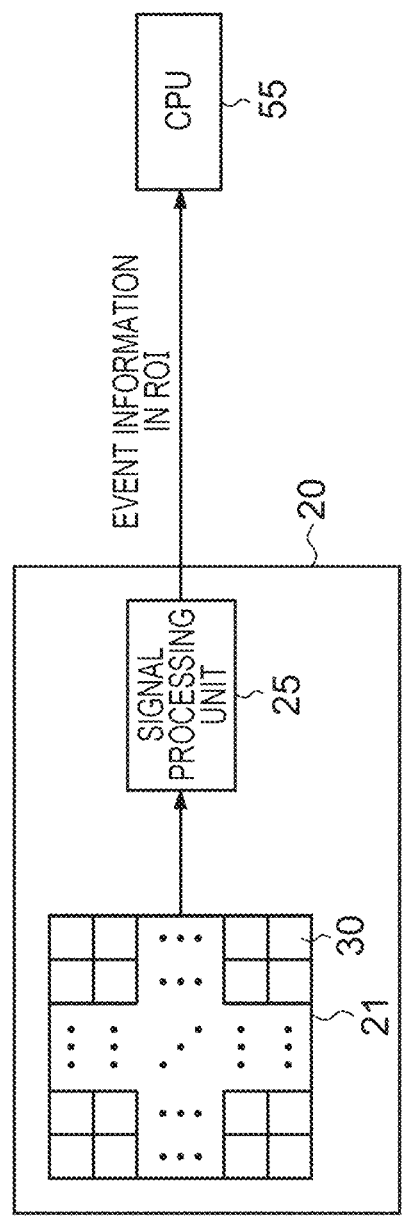
FIG. 29 is a block diagram illustrating a connection relationship between a signal processing unit and a CPU according to a sixth embodiment.

FIG. 29 is a block diagram illustrating a connection relationship between the signal processing unit 25 and the CPU 55 according to the sixth embodiment. The signal processing unit 25 in FIG. 29 extracts a pixel region where event detection is to be performed in the pixel array unit 21 on the basis of the event signal output from the pixel array unit 21, and sets this pixel region as an ROI. The signal processing unit 25 transmits the event information detected within the range of the ROI to the CPU 55. The event information transmitted to the CPU 55 includes information such as a pixel position where an event has occurred and the number of events. As a result, the amount of data of the event information transmitted to the CPU 55 can be reduced.

Figure 30:
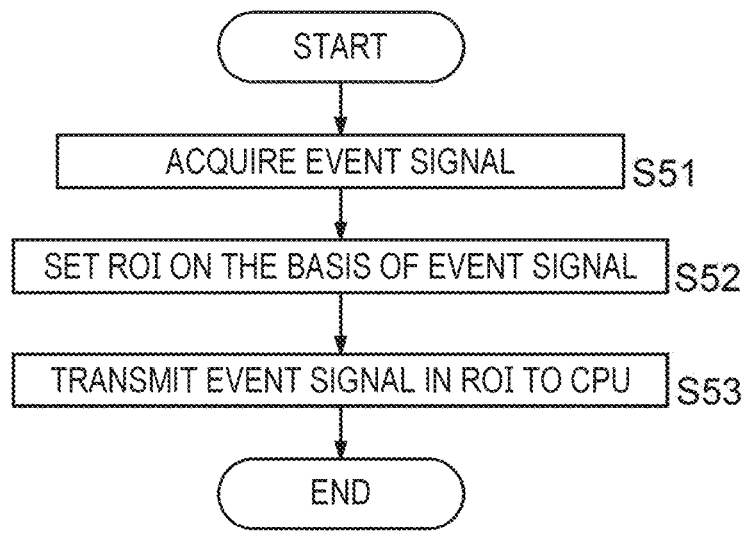
FIG. 30 is a flowchart showing processing operations of the signal processing unit and the CPU in FIG. 29.

FIG. 30 is a flowchart illustrating processing operations of the signal processing unit 25 and the CPU 55 in FIG. 29. First, the signal processing unit 25 acquires the event signal output from the pixel array unit 21 (step S51). Next, the signal processing unit 25 extracts a pixel region where an event has occurred on the basis of the event signal, and sets the extracted pixel region as an ROI (step S52). Next, the signal processing unit 25 transmits the event information in the ROI to the CPU 55 (step S53). The CPU 55 performs various types of signal processing on the basis of the event information transmitted from the signal processing unit 25.

As described above, in the sixth embodiment, since the ROI is set by the signal processing unit 25 on the basis of the event signal output from the pixel array unit 21 and the event information in the ROI is transmitted to the CPU 55, the amount of data transmitted from the signal processing unit 25 to the CPU 55 can be reduced, and the power consumption in the entire imaging system 10 can be reduced.

Seventh Embodiment

In the seventh embodiment, an ROI is set on the basis of an event signal output from the pixel array unit 21, and the set ROI is transmitted to another imaging device (imaging unit) 20.

Figure 31:
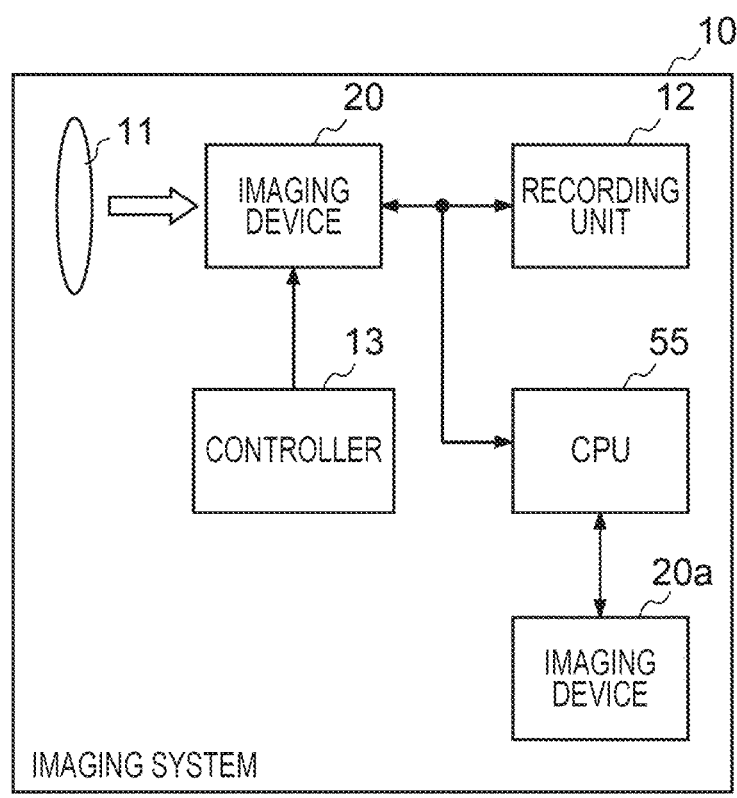
FIG. 31 is a block diagram illustrating a schematic configuration of an imaging system according to a seventh embodiment.

FIG. 31 is a block diagram illustrating a schematic configuration of the imaging system 10 according to the seventh embodiment. The imaging system 10 in FIG. 31 includes a new imaging device 20a in addition to the configuration of the imaging system 10 in FIG. 1. The newly added imaging device 20a may be, for example, a normal CMOS image sensor (CIS) that outputs a luminance signal. In the following description, it is assumed that the newly added imaging device 20a outputs luminance signals of all pixels in the designated pixel region.

Figure 32:
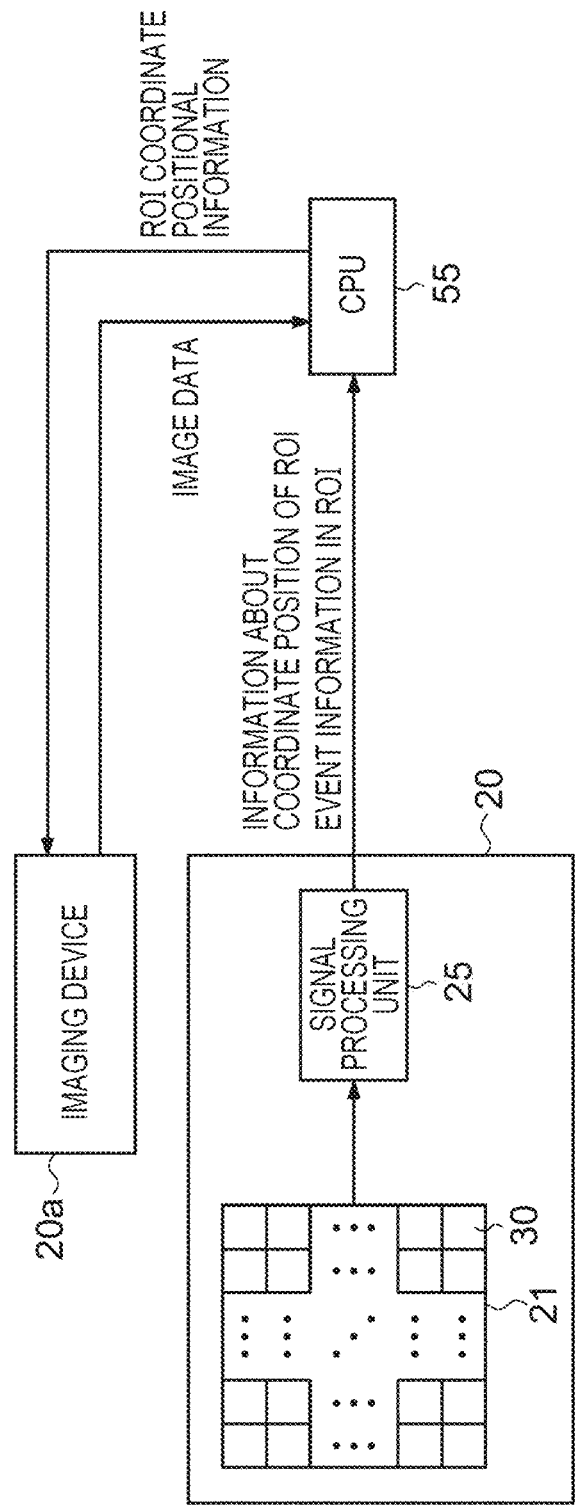
FIG. 32 is a block diagram illustrating a connection relationship between a signal processing unit and a CPU according to the seventh embodiment.

FIG. 32 is a block diagram illustrating a connection relationship between the signal processing unit 25 and the CPU 55 according to the seventh embodiment. The signal processing unit 25 in FIG. 32 sets a pixel region including an occurrence place of an event on the basis of the event signal output from the pixel array unit 21, and sets this pixel region as an ROI. The signal processing unit 25 transmits the event information in the ROI and the information about the coordinate position of the ROI to the CPU 55.

The CPU 55 transmits information about the received coordinate position of the ROI to the imaging device 20a. The imaging device 20a transmits image data including a luminance signal in the ROI to the CPU 55 on the basis of the information about the received coordinate position of the ROI. The CPU 55 performs, for example, an image process on the basis of the event information in the ROI transmitted from the signal processing unit 25 and the image data in the ROI transmitted from the imaging device 20a.

For example, the CPU 55 may perform a process of correcting the luminance information about the underexposed pixel region in the image data output from the imaging device 20a on the basis of the event information transmitted from the signal processing unit 25. As described above, the CPU 55 functions as a correction processing unit configured to correct the image data from the imaging device 20a on the basis of the event information.

Figure 33:
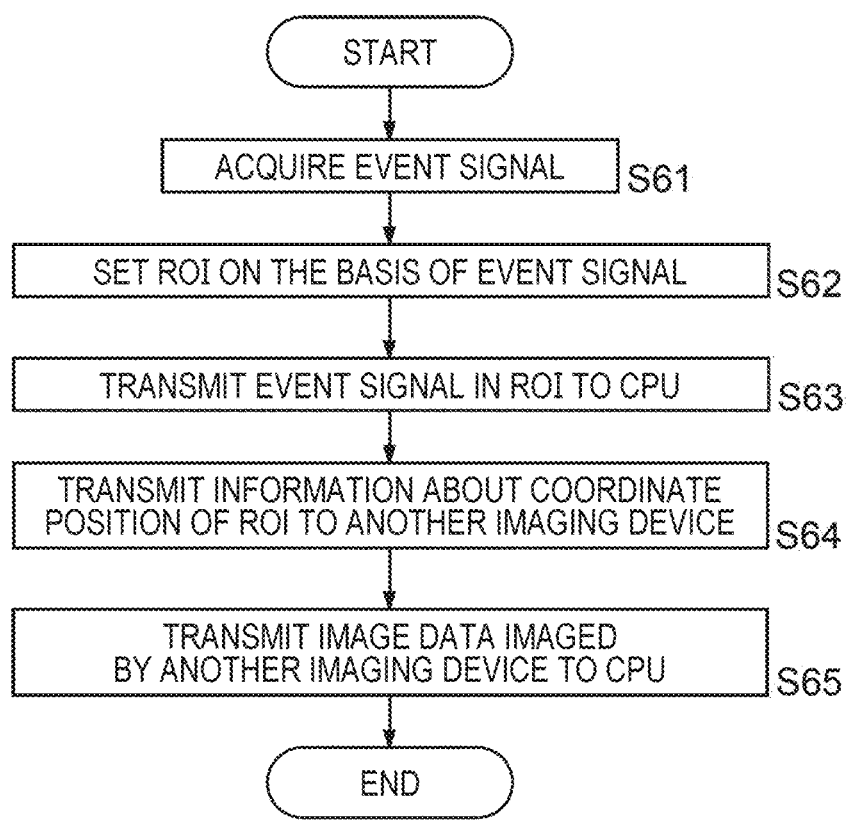
FIG. 33 is a flowchart showing processing operations of the signal processing unit and the CPU in FIG. 32.

FIG. 33 is a flowchart illustrating processing operations of the signal processing unit 25 and the CPU 55 in FIG. 32. Steps S61 to S63 in FIG. 33 are similar to steps S41 to 343 in FIG. 30. The CPU 55 transmits information about the coordinate position of the ROI received from the signal processing unit 25 to the imaging device 20a (step S64). The imaging device 20a images the pixel region of the ROI on the basis of information about the left table position of the ROI received from the CPU 55 to transmit the imaged image data to the CPU 55 (step S65). For example, the CPU 55 can perform correction process on the image data transmitted from the imaging device 20a on the basis of the event information transmitted from the signal processing unit 25, and generate new image data. Note that the processing content of the CPU 55 is not limited.

As described above, in the seventh embodiment, the ROI is set on the basis of the event signal, and the imaging is performed by another imaging device 20a within the set ROI. Therefore, for example, the image data for the region where the event has occurred can be acquired, and the event information can be used for the correction processing of the image data. In addition, according to the present embodiment, since the newly provided imaging device 20a does not generate image data for a pixel region where no event has occurred, the imaging system 10 can reduce the communication amount of image data as a whole, and can reduce power consumption.

<Application Example of Technology According to Present Disclosure>

The technology according to the present disclosure can be applied to various products. Hereinafter, a more specific application example will be described. For example, the technology according to the present disclosure may be realized as a distance measuring device mounted on any type of moving body such as an automobile, an electric vehicle, a hybrid electric vehicle, a motorcycle, a bicycle, a personal mobility, an airplane, a drone, a ship, a robot, a construction machine, and an agricultural machine (tractor).

[Moving Body]

Figure 34:
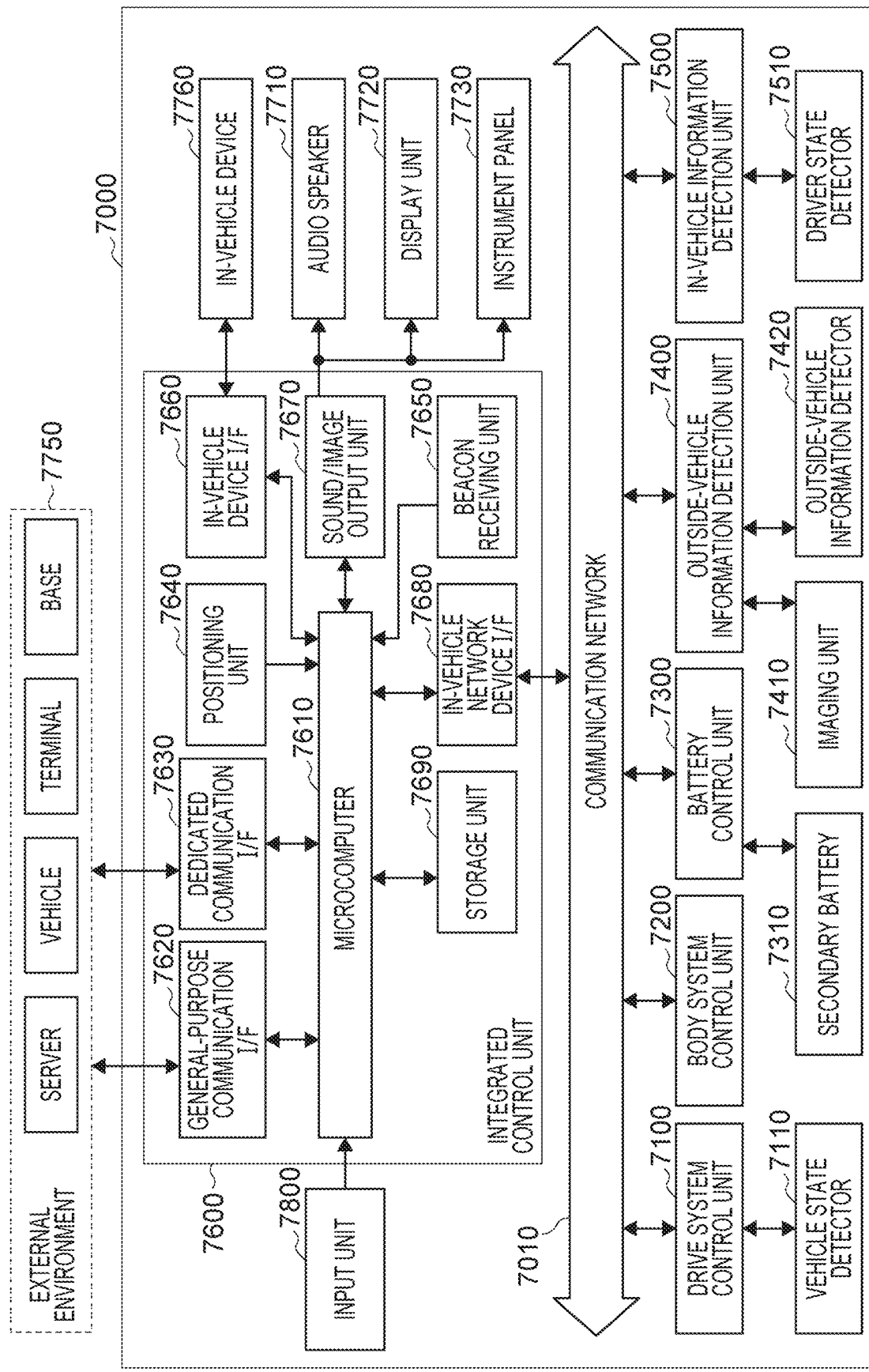
FIG. 34 is a block diagram illustrating a schematic configuration example of a vehicle control system which is an example of a moving body control system to which the technology according to the present disclosure can be applied.

FIG. 34 is a block diagram illustrating a schematic configuration example of a vehicle control system 7000 which is an example of a moving body control system to which the technology according to the present disclosure can be applied. The vehicle control system 7000 includes a plurality of electronic control units connected via a communication network 7010. In the example illustrated in FIG. 34, the vehicle control system 7000 includes a drive system control unit 7100, a body system control unit 7200, a battery control unit 7300, an outside-vehicle information detection unit 7400, an in-vehicle information detection unit 7500, and an integrated control unit 7600. The communication network 7010 connecting the plurality of control units may be, for example, an in-vehicle communication network conforming to an any standard such as a controller area network (CAN), a local interconnect network (LIN), a local area network (LAN), or FlexPay (registered trademark).

Each control unit includes a microcomputer that performs arithmetic processing according to various programs, a storage unit that stores programs executed by the microcomputer, parameters used for various calculations, or the like, and a drive circuit that drives various devices to be controlled. Each control unit includes a network I/F for communicating with other control units via the communication network 7010, and a communication I/F for communicating with devices, sensors, or the like inside and outside the vehicle by wired communication or wireless communication. In FIG. 34, as a functional configuration of the integrated control unit 7600, a microcomputer 7610, a general-purpose communication I/F 7620, a dedicated communication I/F 7630, a positioning unit 7640, a beacon receiving unit 7650, an in-vehicle device I/F 7660, a sound/image output unit 7670, an in-vehicle network I/F 7680, and a storage unit 7690 are illustrated. The other control units similarly include a microcomputer, a communication I/F, a storage unit, and the like.

The drive system control unit 7100 controls the operation of devices related to the drive system of the vehicle according to various programs. For example, the drive system control unit 7100 serves as a driving force generation device that generates the driving force of the vehicle such as an internal combustion engine or a driving motor, a driving force transmission mechanism that transmits the driving force to the wheels, a steering mechanism for adjusting a steering angle of the vehicle, and a control device such as a braking device that generates a braking force of the vehicle. The drive system control unit 7100 may have a function as a control device such as an antilock brake system (ABS) or an electronic stability control (ESC).

A vehicle state detector 7110 is connected to the drive system control unit 7100. The vehicle state detector 7110 includes, for example, at least one of a gyro sensor that detects an angular velocity of axial rotational motion of a vehicle body, an acceleration sensor that detects at acceleration of the vehicle, or a sensor that detects an operation amount of an accelerator pedal, an operation amount of a brake pedal, a steering angle of a steering wheel, an engine speed, a wheel rotation speed, or the like. The drive system control unit 7100 performs arithmetic processing using a signal input from the vehicle state detector 7110, and controls an internal combustion engine, a driving motor, an electric power steering device, a brake device, or the like.

The body system control unit 7200 controls operations of various devices mounted on the vehicle body according to various programs. For example, the body, system control unit 7200 functions as a control device of a keyless entry system, a smart key system, a power window device, or various lamps such as a head lamp, a back lamp, a brake lamp, a blinker, or a fog lamp. In this case, radio waves transmitted from a portable device that substitutes for a key or signals of various switches can be input to the body system control unit 7200. The body system control unit 7200 receives input of these radio waves or signals, and controls a door lock device, a power window device, a lamp, and the like of the vehicle.

The battery control unit 7300 controls a secondary battery 7310, which is a power supply source of the driving motor, according to various programs. For example, information such as a battery temperature, a battery output voltage, or a remaining capacity of a battery is input to the battery control unit 7300 from a battery device including the secondary battery 7310. The battery control unit 7300 performs arithmetic processing using these signals, and performs temperature adjustment control of the secondary battery 7310 or control of a cooling device or the like included in the battery device.

The outside-vehicle information detection unit 7400 detects information outside the vehicle on which the vehicle control system 7000 is mounted. For example, at least one of an imaging unit 7410 or an outside-vehicle information detector 7420 is connected to the outside-vehicle information detection unit 7400. The imaging unit 7410 includes at least one of a time of flight (ToF) camera, a stereo camera, a monocular camera, an infrared camera, or other cameras. The outside-vehicle information detector 7420 includes, for example, at least one of an environment sensor that detects current atmospheric conditions or weather conditions, or a surrounding information detection sensor that detects another vehicle, an obstacle, a pedestrian, or the like around the vehicle on which the vehicle control system 7000 is mounted.

The environment sensor may be, for example, at least one of a raindrop sensor that detects rainy weather, a fog sensor that detects fog, a sunshine sensor that detects a degree of sunshine, or a snow sensor that detects snowfall. The surrounding information detection sensor may be at least one of an ultrasonic sensor, a radar device, or a light detection and ranging, laser imaging detection and ranging (LIDAR) device. The imaging unit 7410 and the outside-vehicle information detector 7420 may be provided as independent sensors or devices, or may be provided as a device in which a plurality of sensors or devices is integrated.

Figure 35:
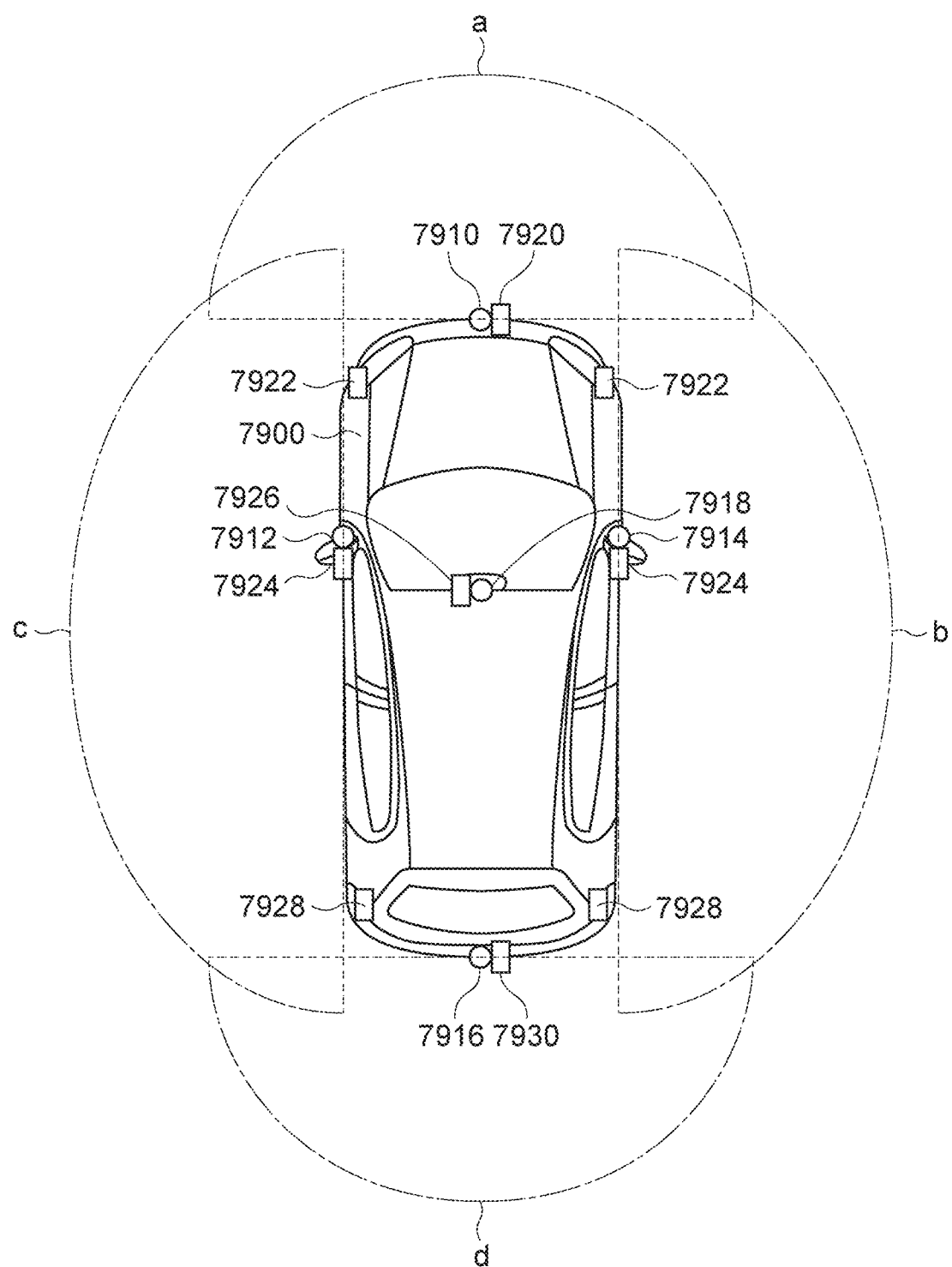
FIG. 35 is a diagram illustrating an example of an installation position of an imaging unit.

Here, FIG. 35 illustrates an example of installation positions of the imaging unit 7410 and the outside-vehicle information detector 7420. The imaging units 7910, 7912, 7914, 7916, and 7918 are provided, for example, at least one position of a front nose, a sideview mirror, a rear bumper, a back door, or an upper portion of a windshield in a vehicle interior of the vehicle 7900. The imaging unit 7910 provided at the front nose and the imaging unit 7918 provided at the upper portion of the windshield in the vehicle interior mainly acquire images in front of the vehicle 7900. The imaging units 7912 and 7914 provided at the sideview mirrors mainly acquire images of the sides of the vehicle 7900. The imaging unit 7916 provided on the rear bumper or the back door mainly acquires an image behind the vehicle 7900. The imaging unit 7918 provided at the upper portion of the windshield in the vehicle interior is mainly used to detect a preceding vehicle, a pedestrian, an obstacle, a traffic light, a traffic sign, a lane, or the like.

Note that FIG. 35 illustrates an example of imaging ranges of the respective imaging units 7910, 7912, 7914, and 7916. An imaging range a indicates an imaging range of the imaging unit 7910 provided at the front nose, imaging ranges b and c indicate imaging ranges of the imaging units 7912 and 7914 provided at the sideview mirrors, respectively, and an imaging range d indicates an imaging range of the imaging unit 7916 provided at the rear bumper or the back door. For example, by superimposing image data captured by the imaging units 7910, 7912, 7914, and 7916, a bird's-eye view image of the vehicle 7900 when viewed from above can be obtained.

Outside-vehicle information detectors 7920, 7922, 7924, 7926, 7928, and 7930 provided at the front, rear, sides, corners, and the upper portion of the windshield in the vehicle interior of the vehicle 7900 may be, for example, ultrasonic sensors or radar devices. The outside-vehicle information detectors 7920, 7926, and 7930 provided at the front nose, the rear bumper, the back door, and the upper portion of the windshield in the vehicle interior of the vehicle 7900 may be, for example, LIDAR devices. These outside-vehicle information detectors 7920 to 7930 are mainly used for detecting a preceding vehicle, a pedestrian, an obstacle, or the like.

Returning to FIG. 34, the description will be continued. The outside-vehicle information detection unit 7400 causes the imaging unit 7410 to capture an image outside the vehicle, and receives the captured image data. In addition, the outside-vehicle information detection unit 7400 receives detection information from the connected outside-vehicle information detector 7420. In a case where the outside-vehicle information detector 7420 is an ultrasonic sensor, a radar device, or a LIDAR device, the outside-vehicle information detection unit 7400 transmits ultrasonic waves, electromagnetic waves, or the like, and receives information about received reflected waves. The out side-vehicle information detection unit 7400 may perform processing of detecting an object such as a human, a vehicle, an obstacle, a sign, or a character on a road surface, or processing of detecting a distance thereto on the basis of the received information. The outside-vehicle information detection unit 7400 may perform environment recognition processing of recognizing rainfall, fog, road surface conditions, or the like on the basis of the received information. The outside-vehicle information detection unit 7400 may calculate a distance to an object outside the vehicle on the basis of the received information.

In addition, the outside-vehicle information detection unit 7400 may perform image recognition processing of recognizing a person, a car, an obstacle, a sign, a character on a road surface, or the like or distance detection processing on the basis of the received image data. The outside-vehicle information detection unit 7400 may perform processing such as distortion correction or alignment on the received image data, and combine image data captured by different imaging units 7410 to generate a bird's-eye view image or a panoramic image. The outside-vehicle information detection unit 7400 may perform viewpoint conversion processing using image data captured by different imaging units 7410.

The in-vehicle information detection unit 7500 detects information inside the vehicle. For example, a driver state detector 7510 that detects a state of a driver is connected to the in-vehicle information detection unit 7500. The driver state detector 7510 may include a camera that images the driver, a biometric sensor that detects biometric information about the driver, a microphone that collects sound in the vehicle interior, or the like. The biometric sensor is provided, for example, on a seat face, a steering wheel, or the like, and detects biometric information about an occupant sitting on a seat or a driver holding the steering wheel. The in-vehicle information detection unit 7500 may calculate the degree of fatigue or the degree of concentration of the driver or may determine whether or not the driver is dozing on the basis of the detection information input from the driver state detector 7510. The in-vehicle information detection unit 7500 may perform processing such as the noise canceling process on the collected sound signal.

The integrated control unit 7600 controls the overall operation in the vehicle control system 7000 according to various programs. An input unit 7800 is connected to the integrated control unit 7600. The input unit 7800 is realized by, for example, a device that can be operated for input by an occupant such as a touch panel, a button, a microphone, a switch, or a lever. Data obtained by performing voice recognition on the voice input by the microphone may be input to the integrated control unit 7600. The input unit 7800 may be, for example, a remote control device using infrared rays or other radio waves, or an external connection device such as a mobile telephone or a personal digital assistant (PDA) associated with the operation of the vehicle control system 7000. The input unit 7800 may be, for example, a camera, and in this case, the occupant can input information by gesture. Alternatively, data obtained by detecting the movement of the wearable device worn by the occupant may be input. Furthermore, the input unit 7800 may include, for example, an input control circuit or the like that generates an input signal on the basis of information input by the occupant or the like using the input unit 7800 to output the input signal to the integrated control unit 7600. By operating the input unit 7800, the occupant or the like inputs various pieces of data to the vehicle control system 7000 or instructs a processing operation.

The storage unit 7690 may include a read only memory (ROM) that stores various programs to be executed by the microcomputer, and a random access memory (RAM) that stores various parameters, calculation results, sensor values, or the like. In addition, the storage unit 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may implement a cellular communication protocol such as global system of mobile communications (GSM) (registered trademark), WiMAX, long term evolution (LTE), or LTE-advanced (LTE-A), or another wireless communication protocol such as wireless LAN (also referred to as Wi-Fi (registered trademark)) or Bluetooth (registered trademark). The general-purpose communication I/F 7620 may be connected to a device (for example, an application server or a control server) existing on an external network (for example, the Internet, a cloud network, or a company-specific network) via, for example, a base station or an access point in addition, the general-purpose communication I/F 7620 may be connected to a terminal (for example, a terminal of a driver, a pedestrian, or a store, or a machine type communication (MTC) terminal) existing in the vicinity of the vehicle using, for example, a peer to per (P2P) technology.

The dedicated communication I/F 7630 is a communication I/F that supports a communication protocol formulated for use in a vehicle. For example, the dedicated communication I/F 7630 may implement a standard protocol such as wireless access in vehicle environment (WAVE) which is a combination of IEEE 802.11P of the lower layer and IEEE 1609 of the upper layer, dedicated short range communications (DSRC), or a cellular communication protocol. The dedicated communication I/F 7630 typically performs V2X communication which is a concept including one or more of vehicle to vehicle communication, vehicle to infrastructure communication, vehicle to home communication, and vehicle to pedestrian communication.

The positioning unit 7640 receives, for example, a global navigation satellite system (GNSS) signal from a GNSS satellite (for example, a global positioning system (GPS) signal from a GPS satellite), executes positioning, and generates positional information including the latitude, longitude, and altitude of the vehicle. Note that the positioning unit 7640 may identify the current position by exchanging signals with a wireless access point, or may acquire the positional information from a terminal such as a mobile telephone, a PHS, or a smartphone having a positioning function.

The beacon receiving unit 7650 receives, for example, radio waves or electromagnetic waves transmitted from a wireless station or the like installed on a road, and acquires information such as a current position, a traffic jam, a closed road, or a required time. Note that the function of the beacon receiving unit 7650 may be included in the dedicated communication I/F 7630 described above.

The in-vehicle device I/F 7660 is a communication interface that mediates connection between the microcomputer 7610 and various in-vehicle devices 7760 existing in the vehicle. The in-vehicle device I/F 7660 may establish wireless connection using a wireless communication protocol such as wireless LAN, Bluetooth (registered trademark), near field communication (NFC), or wireless USB (WUSB). In addition, the in-vehicle device I/F 7660 may establish wired connection such as Universal Serial Bus (USB), High-Definition Multimedia Interface (HDMI) (registered trademark), or mobile high-definition link (MHL) via a connection terminal (and, if necessary, a cable.) not illustrated. The in-vehicle device 7760 may include, for example, at least one of a mobile device or a wearable device possessed by an occupant, or an information device carried in or attached to the vehicle. In addition, the in-vehicle device 7760 may include a navigation device that searches for a route to an any destination. The in-vehicle device I/F 7660 exchanges a control signal or a data signal with these in-vehicle devices 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 according to various programs on the basis of information acquired via at least one of the general-purpose communication I/F 7620, the dedicated communication I/F 7630, the positioning unit 7640, the beacon receiving unit 7650, the in-vehicle device I/F 7660, or the in-vehicle network I/F 7680. For example, the microcomputer 7610 may calculate a control target value of the driving force generation device, the steering mechanism, or the braking device on the basis of the acquired information inside and outside of the vehicle, and output a control command to the drive system control unit 7100. For example, the microcomputer 7610 may perform cooperative control for the purpose of implementing functions of an advanced driver assistance system (ADAS) including collision avoidance or impact mitigation of the vehicle, follow-up traveling based on an inter-vehicle distance, vehicle speed maintaining traveling, vehicle collision warning, vehicle lane deviation warning, or the like. In addition, the microcomputer 7610 may perform cooperative control for the purpose of automated driving or the like in which the vehicle autonomously travels without depending on the operation of the driver by controlling the driving force generation device, the steering mechanism, the braking device, or the like on the basis of the acquired information around the vehicle.

The microcomputer 7610 may generate three-dimensional distance information between the vehicle and an object such as a surrounding structure or a person on the basis of information acquired via at least one of the general-purpose communication I/F 7620, the dedicated communication I/F 7630, the positioning unit 7640, the beacon receiving unit 7650, the in-vehicle device I/F 7660, or the in-vehicle network I/F 7680, and create local map information including information about surroundings of the current position of the vehicle. In addition, the microcomputer 7610 may predict danger such as collision of the vehicle, approach of a pedestrian or the like, or entry into a closed road on the basis of the acquired information, and generate a warning signal. The warning signal may be, for example, a signal for generating a warning sound or turning on a warning lamp.

The sound/image output unit 7670 transmits an output signal of at least one of a sound or an image to an output device capable of visually or audibly notifying an occupant of the vehicle or the outside of the vehicle of information. In the example of FIG. 34, an audio speaker 7710, a display unit 7720, and an instrument panel 7730 are illustrated as the output device. The display unit 7720 may include, for example, at least one of an on-board display or a head-up display. The display unit 7720 may have an augmented reality (AR) display function. The output device may be another device other than these devices, such as a headphone, a wearable device such as an eyeglass-type display worn by an occupant, a projector, or a lamp. In a case where the output device is a display device, the display device visually displays results obtained by various processes performed by the microcomputer 7610 or information received from another control unit in various formats such as a text, an image, a table, and a graph. In addition, in a case where the output device is a sound output device, the sound output device converts an audio signal including replayed sound data, acoustic data, or the like into an analog signal and aurally outputs the analog signal.

Note that, in the example illustrated in FIG. 34, at least two control units connected via the communication network 7010 may be integrated as one control unit. Alternatively, each control unit may include a plurality of control units. Furthermore, the vehicle control system 7000 may include another control unit (not shown). In addition, in the above description, some or all of the functions performed by any of the control units may be provided to another control unit. That is, as long as information is transmitted and received via the communication network 7010, predetermined arithmetic processing may be performed by any control unit. Similarly, a sensor or a device connected to any of the control units may be connected to another control unit, and a plurality of control units may mutually transmit and receive detection information via the communication network 7010.

An example of the vehicle control system to which the technology according to the present disclosure can be applied is described above. The technology according to the present disclosure can be applied to, for example, the imaging units 7910, 7912, 7914, 7916, and 7918, the outside-vehicle information detectors 7920, 7922, 7924, 7926, 7928, and 7930, the driver state detector 7510, and the like, among the above-described configurations. Specifically, the imaging system 10 in FIG. 1 including the imaging device of the present disclosure can be applied to these imaging units and detectors. Then, by applying the technology according to the present disclosure, the influence of a noise event such as sensor noise can be mitigated, and the occurrence of a true event can be reliably and quickly sensed, so that safe vehicle traveling can be realized.

Note that the present technology can have the following configurations.

(1) An imaging device including:
a plurality of photoelectric conversion elements each of which is configured to photoelectrically convert incident light to generate an electric signal;
a plurality of detectors each of which is configured to output a detection signal in a case where an absolute value of an amount of change in the electric signal generated by each of the plurality of photoelectric conversion elements exceeds a predetermined threshold value; and
a threshold value adjustment unit configured to adjust the threshold value on the basis of a detection situation of the respective detection signals from the plurality of detectors.

(2) The imaging device according to Item (1), in which the detection situation in the plurality of detectors includes at least one of the number of the detection signals detected in a predetermined region within a predetermined period, a ratio of the number of the detectors that output the detection signals to a total number of the detectors in the predetermined region, or a signal level of the detection signals.

(3) The imaging device according to Item (2), in which the threshold value adjustment unit adjusts the threshold value in at least one of a case where the number of the detection signals in the predetermined region within the predetermined period is greater than or equal to a first reference value or a case where the number of the detection signals in the predetermined region within the predetermined period is less than a second reference value.

(4) The imaging device according to Item (3), in which the threshold value adjustment unit adjusts the threshold value so that detection sensitivity of the detector is low in a case where the number of the detection signals in the predetermined region within the predetermined period is equal to or greater than the first reference value.

(5) The imaging device according to Item (3), in which the threshold value adjustment unit adjusts the threshold value so that detection sensitivity of the detector is high in a case where the number of the detection signals in the predetermined region within the predetermined period is less than the second reference value.

(6) The imaging device according to any one of items (1) to (5), in which
the threshold value includes a first threshold value and a second threshold value,
the detector includes
a first detector configured to detect a first detection signal in a case where an absolute value of an amount of change when the electric signal changes in an increasing direction exceeds the first threshold value and
a second detector configured to detect a second detection signal in a case where an absolute value of an amount of change when the electric signal changes in a decreasing direction exceeds the second threshold value, and
the threshold value adjustment unit adjusts the first threshold value and the second threshold value on the basis of detection situations in the first detector and the second detector.

(7) The imaging device according to Item (6), further including:
a first determination unit configured to determine whether or not a detection situation in the first detector is within a first allowable range, and a second determination unit configured to determine whether or not a detection situation in the second detector is within a second allowable range, in which the threshold value adjustment unit adjusts the first threshold value when the first determination unit determines that the detection situation is not within the first allowable range, and adjusts the second threshold value when the second determination unit determines that the detection situation is not within the second allowable range.

(8) An imaging device including:

a plurality of first photoelectric conversion elements each of which is configured to photoelectrically convert incident light to generate an electric signal;

a plurality of detectors each of which is configured to output a detection signal in a case where an absolute value of an amount of change in the electric signal generated by each of the plurality of first photoelectric conversion elements exceeds a predetermined threshold value; and a region extraction unit configured to extract a partial region within an angle of view in which the plurality of first photoelectric conversion elements performs photoelectrical conversion on the basis of a detection situation of the detection signals from the plurality of detectors.

(9) The imaging device according to Item (8), in which the region extraction unit extracts the partial region on the basis of positions where the detection signals are output within an angle of view in which the plurality of first photoelectric conversion elements performs photoelectrical conversion.

(10) The imaging device according to Item (8) or (9), further including an object recognition unit configured to recognize an object present within an angle of view in which the plurality of first photoelectric conversion elements performs photoelectrical conversion on the basis of a detection situation of the detection signals from the plurality of detectors, in which the region extraction unit extracts the partial region including the object recognized by the object recognition unit.

(11) The imaging device according to any one of Items (8) to (10), further including a notification unit configured to notify at least one of the plurality of first photoelectric conversion elements or the plurality of detectors or information about the partial region.

(12) The imaging device according to Item (11), in which the notification unit notifies the detector of information regarding an appropriate number of the detection signals to be detected by the plurality of detectors together with the information about the partial region.

(13) The imaging device according to Item (12), in which the plurality of detectors adjusts the threshold value on the basis of information regarding an appropriate number of the detection signals notified by the notification unit.

(14) The imaging device according to any one of items (11) to (13), further including an information processing unit configured to generate operating condition information including at least one of a photoelectric conversion speed by the plurality of first photoelectric conversion elements, a ratio of first photoelectric conversion elements that perform photoelectric conversion to the plurality of first photoelectric conversion elements, or an activation frequency of the plurality of first photoelectric conversion elements on the basis of a detection situation of the detection signals from the plurality of detectors, in which the notification unit notifies at least one of the plurality of first photoelectric conversion elements or the plurality of detectors of the operating condition information.

(15) The imaging device according to Item (8) or (9), in which the region extraction unit outputs event information based on the detection signals output from the detectors associated with the first photoelectric conversion elements located in the partial region.

(16) The imaging device according to Item (15), in which the region extraction unit outputs information about the coordinate position of the partial region together with the event information.

(17) The imaging device according to any one of Items (8) to (16), further including an imaging unit that includes a plurality of second photoelectric conversion elements each of which photoelectrically converts incident light to generate an electric signal, and that is configured to output image data in the partial region on the basis of the electric signal.

(18) The imaging device according to Item (17), further including an image correction unit configured to correct the image data on the basis of event information based on the detection signals output from the detectors associated with the first photoelectric conversion elements located in the partial region.

(19) An imaging method including outputting a detection signal in a case where an absolute value of an amount of change in an electric signal generated by a plurality of photoelectric conversion elements each of which photoelectrically converts incident light to generate the electric signal exceeds a predetermined threshold value, and adjusting the threshold value on the basis of a detection situation of the detection signals.

(20) The imaging method according to Item (19), the method further includes extracting a partial region within an angle of view in which the plurality of first photoelectric conversion elements performs photoelectrical conversion on the basis of a detection situation of the detection signals.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined is the claims and equivalents thereof.

REFERENCE SIGNS LIST

10 Imaging system
11 Imaging lens
12 Recording unit
13 Controller
20 Imaging device
21 Pixel array unit
22 Drive unit
23 Arbiter unit
24 Column processing unit
25 Signal processing unit
27 Read region selection unit
28 Signal generation unit
Pixel 30
31 Light receiving unit
32 Pixel signal generation unit
33 Address event detector 51 Event counter
52 Threshold value adjustment unit
53 Frequency determination unit
54 Event output processing unit
55 CPU

The invention claimed is:

1. An imaging device comprising:
a plurality of photoelectric conversion elements each of which is configured to photoelectrically convert incident light to generate an electric signal;
a plurality of detectors each of which is configured to output a detection signal in a case where an absolute value of an amount of change in the electric signal generated by each of the plurality of photoelectric conversion elements exceeds a predetermined threshold value; and
at least one processor configured to perform a threshold value adjustment that adjusts the threshold value on a basis of a detection situation of the respective detection signals from the plurality of detectors.

2. The imaging device according to claim 1, wherein the detection situation in the plurality of detectors includes at least one of a number of the detection signals detected in a predetermined region within a predetermined period, a ratio of the number of the detectors that output the detection signals to a total number of the detectors in the predetermined region, or a signal level of the detection signals.

3. The imaging device according to claim 2, wherein the threshold value adjustment adjusts the threshold value in at least one of a case where the number of the detection signals in the predetermined region within the predetermined period is greater than or equal to a first reference value or a case where the number of the detection signals in the predetermined region within the predetermined period is less than a second reference value.

4. The imaging device according to claim 3, wherein the threshold value adjustment adjusts the threshold value so that detection sensitivity of the detector is low in a case where the number of the detection signals in the predetermined region within the predetermined period is equal to or greater than the first reference value.

5. The imaging device according to claim 3, wherein the threshold value adjustment adjusts the threshold value so that detection sensitivity of the detector is high in a case where the number of the detection signals in the predetermined region within the predetermined period is less than the second reference value.

6. The imaging device according to claim 1, wherein the threshold value includes a first threshold value and a second threshold value,
the detector includes a first detector and a second detector,
the first detector is configured to detect a first detection signal in a case where an absolute value of an amount of change when the electric signal changes in an increasing direction exceeds the first threshold value,
the second detector is configured to detect a second detection signal in a case where an absolute value of an amount of change when the electric signal changes in a decreasing direction exceeds the second threshold value, and
the threshold value adjustment adjusts the first threshold value and the second threshold value on a basis of detection situations in the first detector and the second detector.

7. The imaging device according to claim 6, wherein the at least one processor is configured to perform a first determination and a second determination,
the first determination determining whether or not a detection situation in the first detector is within a first allowable range, and
the second determination determining whether or not a detection situation in the second detector is within a second allowable range, and wherein
the threshold value adjustment adjusts the first threshold value when the first determination determines that the detection situation is not within the first allowable range, and adjusts the second threshold value when the second determination determines that the detection situation is not within the second allowable range.

8. An imaging device comprising:
a plurality of first photoelectric conversion elements each of which is configured to photoelectrically convert incident light to generate an electric signal;
a plurality of detectors each of which is configured to output a detection signal in a case where an absolute value of an amount of change in the electric signal generated by each of the plurality of first photoelectric conversion elements exceeds a predetermined threshold value; and
at least one processor configured to perform a region extraction that extracts a partial region within an angle of view in which the plurality of first photoelectric conversion elements performs photoelectrical conversion on a basis of a detection situation of the detection signals from the plurality of detectors.

9. The imaging device according to claim 8, wherein the region extraction extracts the partial region on a basis of positions where the detection signals are output within an angle of view in which the plurality of first photoelectric conversion elements performs photoelectrical conversion.

10. The imaging device according to claim 8, wherein the at least one processor is configured to perform an object recognition that recognizes an object present within an angle of view in which the plurality of first photoelectric conversion elements performs photoelectrical conversion on a basis of a detection situation of the detection signals from the plurality of detectors, wherein the region extraction extracts the partial region including the object recognized by the object recognition.

11. The imaging device according to claim 8, wherein the at least one processor is configured to perform a notification that notifies at least one of the plurality of first photoelectric conversion elements or the plurality of detectors of information about the partial region.

12. The imaging device according to claim 11, wherein the notification notifies the detector of information regarding an appropriate number of the detection signals to be detected by the plurality of detectors together with the information about the partial region.

13. The imaging device according to claim 12, wherein the plurality of detectors adjusts the threshold value on a basis of information regarding an appropriate number of the detection signals notified by the notification.

14. The imaging device according to claim 11, wherein the at least one processor is configured to generate operating condition information including at least one of a photoelectric conversion speed by the plurality of first photoelectric conversion elements, a ratio of first photoelectric: conversion elements that perform photoelectric conversion to the plurality of first photoelectric conversion elements, or an activation frequency of the plurality of first photoelectric conversion elements on a basis of a detection situation of the detection signals from the plurality of detectors, wherein the notification notifies at least one of the plurality of first photoelectric conversion elements or the plurality of detectors of the operating condition information.

15. The imaging device according to claim 8, wherein the region extraction outputs an event information based on the detection signals output from the detectors associated with the first photoelectric conversion elements located in the partial region.

16. The imaging device according to claim 15, wherein the region extraction outputs information about a coordinate position of the partial region together with the event information.

17. The imaging device according to claim 8, further comprising:
an imager that includes a plurality of second photoelectric conversion elements each of which photoelectrically converts incident light to generate an electric signal, and that is configured to output image data in the partial region on a basis of the electric signal.

18. The imaging device according to claim 17, wherein the at least one processor is configured to perform an image correction that corrects the image data on a basis of event information based on the detection signals output from the detectors associated with the first photoelectric conversion elements located in the partial region.

19. An imaging method comprising:
outputting a detection signal in a case where an absolute value of an amount of change in an electric signal generated by a plurality of photoelectric conversion elements each of which photoelectrically converts incident light to generate the electric signal exceeds a predetermined threshold value; and
adjusting the threshold value on a basis of a detection situation of the detection signals.

20. The imaging method according to claim 19, the method further comprising:
extracting a partial region within an angle of view in which the plurality of photoelectric conversion elements performs photoelectrical conversion on a basis of a detection situation of the detection signals.

* * * * *